United States Patent
Yamada et al.

[19]

[11] Patent Number: 5,953,462
[45] Date of Patent: *Sep. 14, 1999

[54] METHOD AND APPARATUS FOR PROCESSING IMAGE

[75] Inventors: Yoshiro Yamada, Tokyo; Toshiaki Hosoda, Kanagawa, both of Japan

[73] Assignee: Yoshiro Yamada, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,744

[22] Filed: Jun. 16, 1997

Related U.S. Application Data

[62] Continuation of application No. 08/210,310, Mar. 14, 1994, abandoned, which is a continuation of application No. 07/588,674, filed as application No. PCT/JP90/00112, Jan. 31, 1990, abandoned.

[30]     Foreign Application Priority Data

| Jan. 31, 1989 | [JP] | Japan | 1-19690 |
| Sep. 11, 1989 | [JP] | Japan | 1-232734 |
| Jan. 21, 1990 | [JP] | Japan | 2-10829 |
| Jan. 24, 1990 | [JP] | Japan | 2-14267 |

[51] Int. Cl.$^6$ ................................................. G06K 9/36
[52] U.S. Cl. ........................................... 382/284; 348/222
[58] Field of Search .................................. 382/130, 284; 348/218, 222, 264, 584

[56]     References Cited

U.S. PATENT DOCUMENTS

| 4,323,973 | 4/1982 | Greenfield | 382/130 |
| 4,713,695 | 12/1987 | Machebauf | 348/584 |
| 4,926,247 | 5/1990 | Nagasaki et al. | 348/584 |
| 5,140,416 | 8/1992 | Tinkler | 358/88 |

*Primary Examiner*—Christopher S. Kelley
*Attorney, Agent, or Firm*—Bierman, Muserlian and Lucas

[57]     ABSTRACT

The present invention relates to improvement of an image processing method and apparatus which senses the state of a test object as image information by a sensor or sensors, outputs a plurality of image information signals and decides or displays said plurality of the image information signals, said image processing method and apparatus characterized by summing said plurality of the image information signals and deciding or processing a plurality of summed signals, said method and appratus permitting the precise sensing of the lightness tone and pattern of the test object.

1 Claim, 25 Drawing Sheets

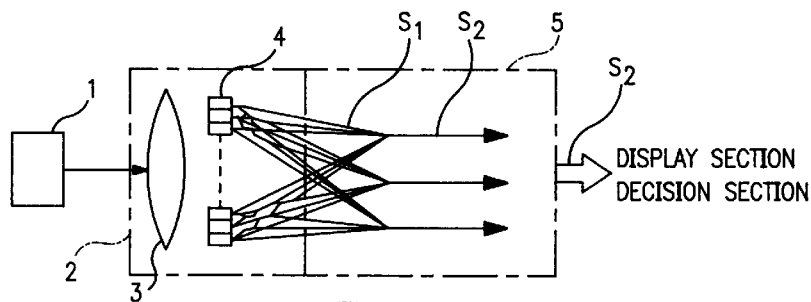
FIG. IA
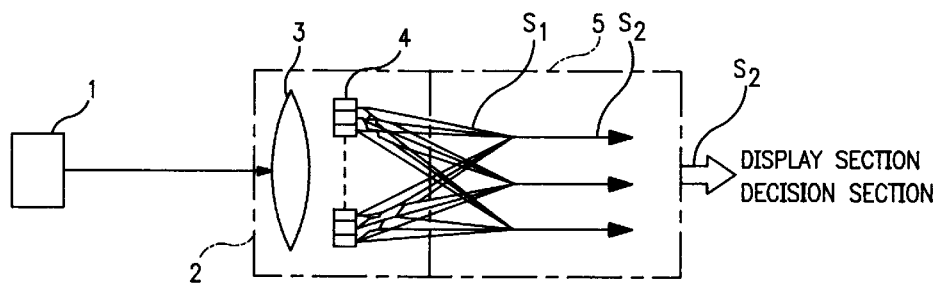
FIG. IB
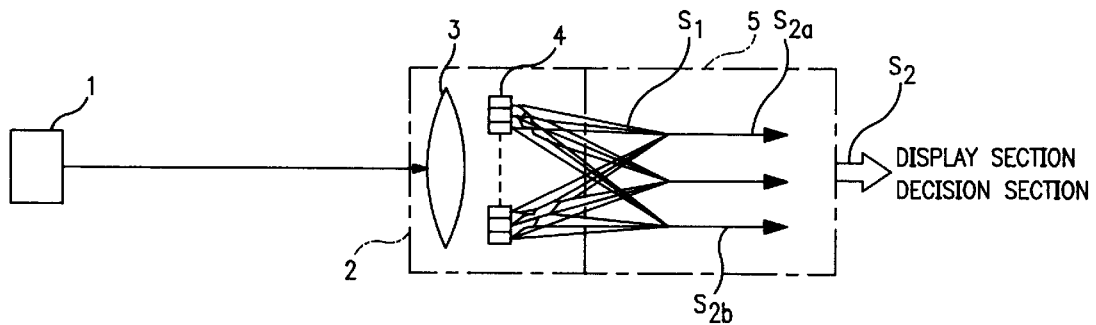
FIG. IC

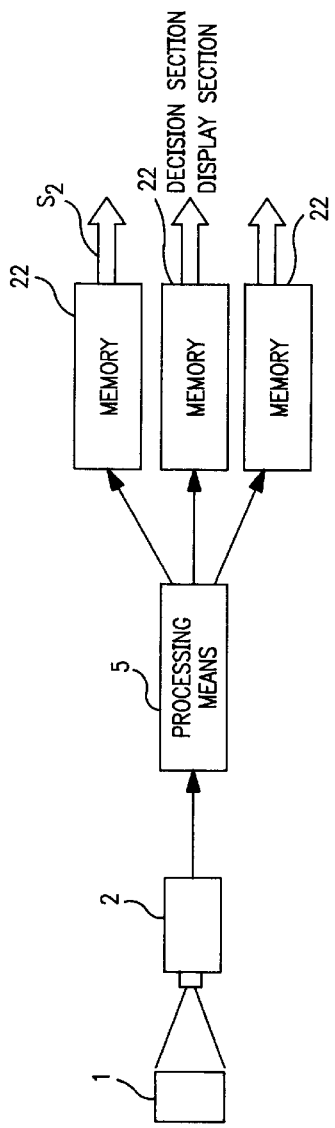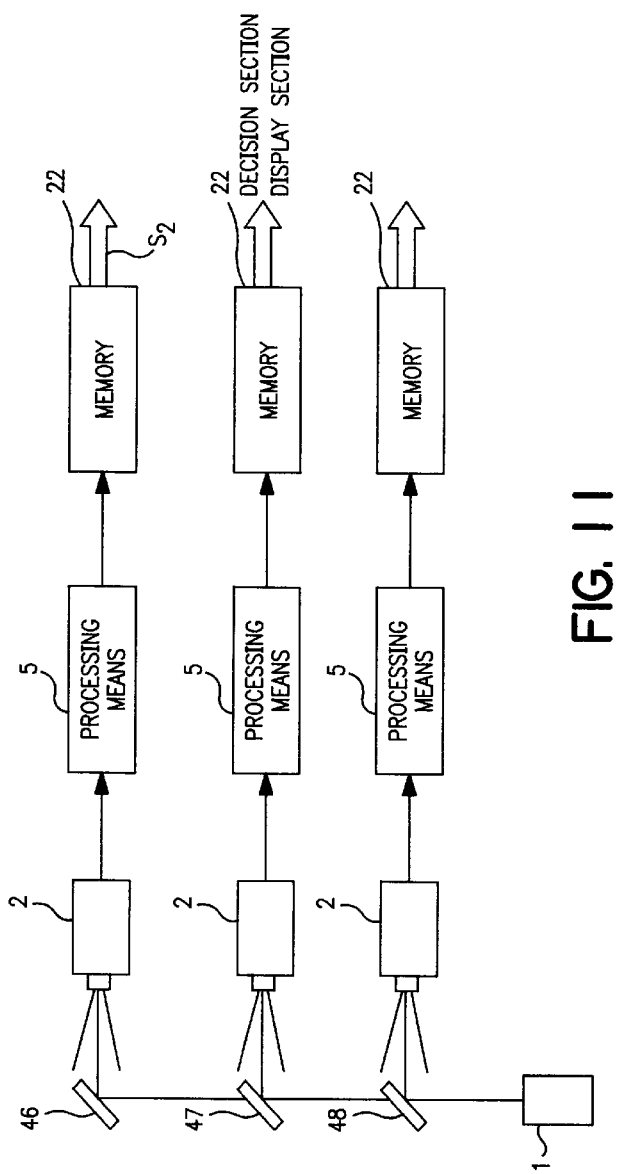
FIG. 10
FIG. 11

METHOD AND APPARATUS FOR PROCESSING IMAGE

PRIOR APPLICATION

This application is a continuation of U.S. patent application Ser. No. 210,310 filed Mar. 14, 1994 which is a continuation of U.S. patent application Ser. No. 588,674, filed Sep. 26, 1990, both now abandoned, which is a 371 of PCT/JP90/00112, filed Jan. 31, 1990.

FIELD OF ART

The present invention relates to a method and an apparatus for processing an image by sensing the state of a test object as image information by means of a sensor or sensors and deciding or displaying the image information.

BACKGROUND

In the past, a method and an apparatus for processing an image by sensing the state of the test object as image information by means of sensors and deciding or displaying the sensed image information, for example, as shown in FIG. 30, senses the state of a test object 1 as image information by a plurality of sensors 4 through a lens 3 of a camera 2, outputs a plurality of image information signals S1 corresponding to the number of sensors 4, processes the image information signals S1 by processing means 5, and decides or displays the state of the test object 1.

The image processing apparatus comprises the camera 2 and processing means 5 as shown in FIGS. 29 and 30.

Camera 2 comprises the lens 3 for refracting the image information on the state of the test object 1, the plurality of sensors 4 for sensing the image information, a driving circuit 56 for driving the sensors, an amplifier 57 for amplifying the signals from the sensors 4, an analog-to-digital converter 8 for converting the signals amplified by the amplifier 57 from analog signals to digital signals, and a buffer circuit 9 for buffering and outputting the digital signals.

Then, the processing means 5 consists of an input buffer circuit 10 for inputting and buffering the image information signals S1 from the buffer circuit 9, a dual port memory 11 for storing output signals from the input buffer circuit 11, a central processing unit 13 for processing the signals from the dual port memory 11 on the basis of a software 12 and an output port 14 for outputting the signals processed by the central processing unit 13 to a decision section or a display section.

Another prior art image processing apparatus, as shown in FIG. 28, consists of a plurality of sensors 4 provided to a camera 2 for sensing the state of test object 1 as image information through a lens 3 and ouputting image information signals S1 of the number corresponding to the number of the sensors 4, a multiplexer 6 for receiving parallel and simultaneously the plurality of image information signals S1 outputted from the sensors 4 and for outputting the image information signals S1 sequentially in time every specified number by a counter 7 and procesing means 5 for receiving and processing the image information signals S1 outputted from the multiplexer 6sequentially in time every specified number.

The output of the processing means 5 is further supplied to a display section or a decision section to display or decide the state of the test object 1.

The above method and apparatus of the prior art, however, decides or displays the state of the test object 1 on the basis of one image information signal S1 to one element of the sensors 4.

For this purpose assuming that each of the sensors 4 can sense the lightness, for example, in 256 tones, there have been problems that the improvement of the ability of sensing the lightness tone with respect to the sensors 4 themselves is difficult and also the more precise sensing of the lightness tone of the test object 1 is difficult.

Therefore, there has been a problem that it is difficult to sense a general pattern, a detailed pattern, an aggregation states or subtle defects of the test object 1.

It is an object of the present invention, therefore, to provide a method and an apparatus which can precisely sense the tone of lightness of the test object on the basis of image information, and hence can precisely sense a general pattern, a detailed pattern, an aggregation state or subtle defects of the test object.

Furthermore, it is an object of the present invention to provide a method and an apparatus which, even if the test object and its background has a similar pattern, can precisely sense the tones of lightness thereof and also can precisely sense the general pattern, the detailed pattern, aggregation states, or subtle defects of the test object.

Still furthermore, it is an object of the present invention to provide a method and an apparatus which even if the test object moves in a predetermined direction, on the basis of image information, can precisely sense the tone of lightness thereof and also can precisely sense the general pattern, the detailed pattern, aggregation state, subtle defects of the test object and so on.

DISCLOSURE OF THE INVENTION

In accordance to the present invention, as shown in FIGS. 1(a), (b), and (c), since the plural of image information signals S1 are summed, the plural summed signals are subtracted or divided each other and then the subtracted or divided signals S2 are decided or displayed to sense the lightness grade, of the test object precisely.

In other words, assuming that, for example, one sensor can sense two hundred fifty six (256) tones of lightness, when the image information signals S1 outputted from, for example, one hundred sensors are summed, then one hundred times two hundred fifty six grades of lightness will be able to be sensed.

Furthermore, as shown in FIG. 1(c), more of the plural image information signals S1 are summed to make the plural image information signals S1 into first summed signals S2a, and then the first plural summed signals S2a are subtracted or divided each other to make the first plural summed signals S2a into first subtracted or divided signals S2. Less of the plural image information signals S1 are summed to make the plural image information signals S1 into second summed signals S2b and then the second plural summed signals S2b are subtracted or divided each other to make the plural second summed signals S2b into second subtracted or divided signals S2. Furthermore, the first and second subtracted or divided signals S2 are decided or displayed simultaneously and in parallel.

The first summed signal S2a obtained from the more of the plurality of image information signals S1 permits a general pattern of test object 1 to be recognized.

The second summed signal S2b obtained from the less of the plurality of image information signals S1 permits the detailed pattern 1a of test object 1 or the detailed pattern 76a of background 76, as shown in FIG. 2.

The operation of the summed signals 2a subtraction or division of the plural or 2b detects either the detailed pattern 1a of the test object 1 or the detailed pattern 76a of the background 76 to be recognized.

Thus, even if the detailed pattern 1a of test object 1 is similar to the detailed pattern 76a of the background 76, the pattern and the tone of lightness of the test object 1 and the background 76 can more precisely be sensed and hence the general pattern, the detailed pattern 1a, the aggregation state and the subtle defects of test object 1, the detailed pattern 76a of the background 76 and so on can precisely be sensed.

Additionally, even though the test object 1 is located at any position in the background 76, the patterns 1a or 76a can stably be sensed.

Moreover, if the optical axis of the lens 3 of the camera 2 is at an angle θ relative to a white line 20 having a uniform width along its length, which line is the test object 1, as shown in FIG. 3, the white line 20 is sensed with the portion near this side enlarged, as shown in FIG. 4.

If the enlarged portion near this side of the white line 20 is sensed by, for example, one thousand sensors 4 corresponding to the width of the enlarged portion and the image information signals S1 are summed, the background 50 is not sensed, but only the white line 20 is sensed, so that the accurate lightness of the white line 20 is sensed in the enlarged portion of the white line 20 near this side.

However, when the remote portion of the white line 20, which is sensed as narrrower width, is sensed by the same one thousand sensors 4, not only the white line 20, but also the background 50 are sensed, so that it becomes difficult that even the summation of the image information signals S1 provides the accurate lightness of the white line 20 due to the influence of the lightness of the background 50. To cope with this, the number of sensors 4, or the number of image imformation signals S1 to be summed is varied for every scanning line.

In other words, the number of sensors 4, or the number of image information signals S1 to be summed, is varied for every scanning line so that the remote portion of the white line 20, which portion is sensed as being narrow, is sensed by, for example, six hundred sensors 4.

Alternatively, if a row of the sensors 4 are located in the tilted relationship relative to the optical axis of the lens 3, as shown in FIG. 5, both the foreground and remote portions of the white line 20, which is the test object, occupy the same width on the row of sensors 4, and hence the lightness of the white line 20, or the test object, can accuratly be sensed.

Thus, even if the optical axis of the lens 3 of the camera 2 forms the angleθ to the test object 1, the conditions, such as lightness, of the test object 1 can surely be sensed.

Consequently, the general pattern, the detailed pattern, the aggregation state, subtle defects and so on of the test object can precisely be sensed.

BRIEF DESCRIPTION OF THE DRAWINGS

FIGS. 1(a), 1(b) and 1(c) are views explaining a method and an apparatus for processing images in accordance with present invention, FIGS. 6 through 27 are views explaining various apparatuses according to the present invention.

BEST CONFIGURATION FOR WORKING THE INVENTION

Hereafter, the present invention will be described by reference to the drawings and on the basis of embodiments thereof.

FIGS. 1(a), (b) and (c) are general explanatory diagrams of an image processing method and apparatus in accordance with the present invention.

Figure 25:
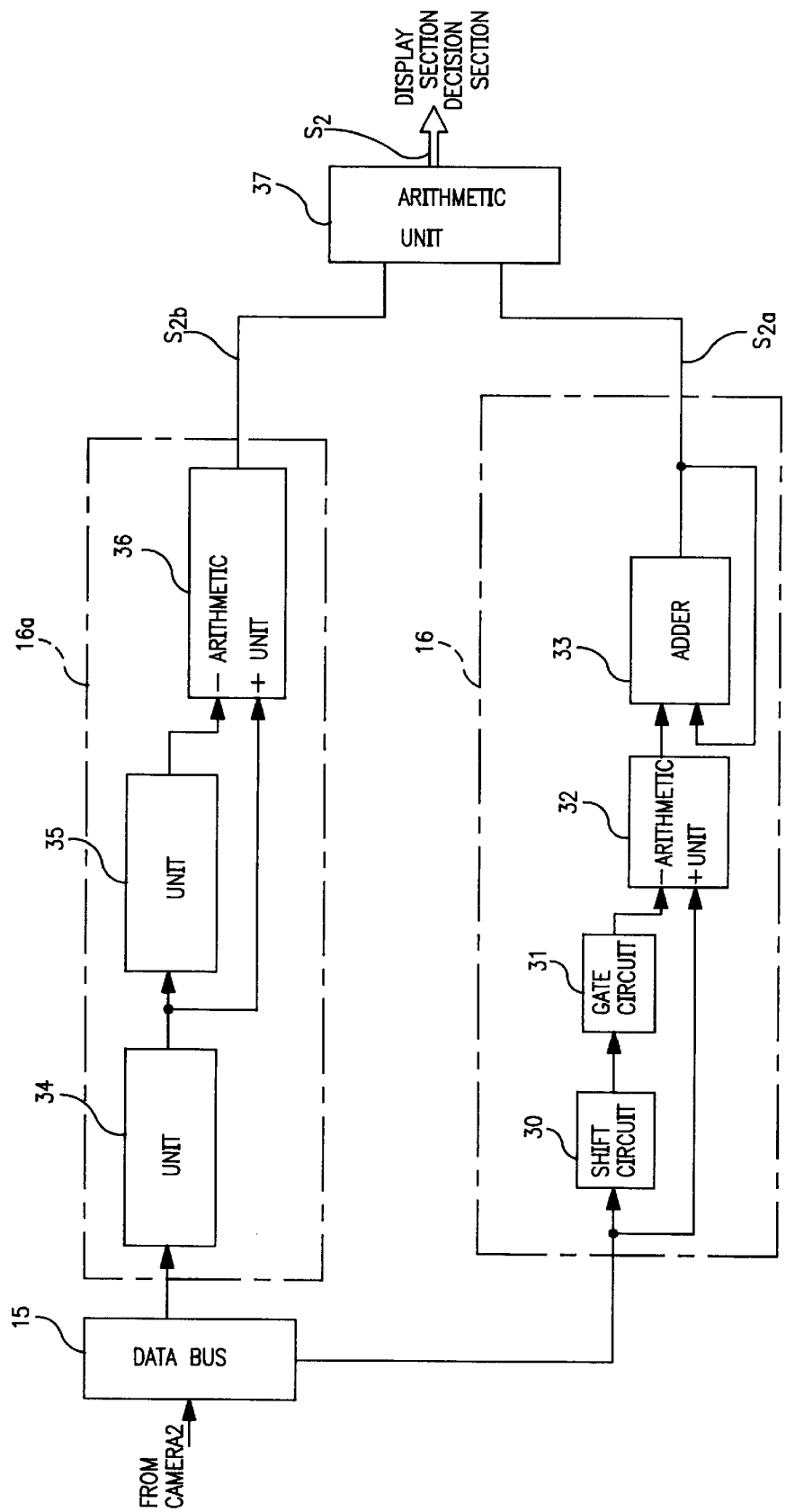

The image processing mehtod in accordance with the present invention is the same as the conventional method of FIG. 25 in sensing the state of a test object 1 as image information by, for example, a plurality of sensors 4 via a lens 3 of a camera 2, outputting a plurality of image information signals S1 corresponding to the number of the sensors 4, and deciding or displaying the plurality of the image information signals S1.

In a method of this embodiment, the plural image information signals S1 are summed as shown in FIGS. 1(a) and (b), the plural summed signals each other are subtracted or divided, and then the subtracted or divided signals S2 are decided or displayed.

Further in a method of another embodiment as shown in FIG. 1(c), more of the plural image information signals S1 are summed to make the plural image information signals S1 into first summed signals S2a, and then the first plural summed signals S2a are subtracted or divided each other to make the first plural summed signals S2a into first subtracted or divided signals S2. Furthermore, less of the plural image information signals S1 are summed to make the plural image information signals S1 into second summed signals S2b and then the second plural summed signals S2b are subtracted or divided each other to make the second plural summed signals S2b into second subtracted or divided signals S2. And then the first and second subtracted or divided signals S2 are decided or displayed simultaneously and in parallel in the decision or display section.

Figure 2:
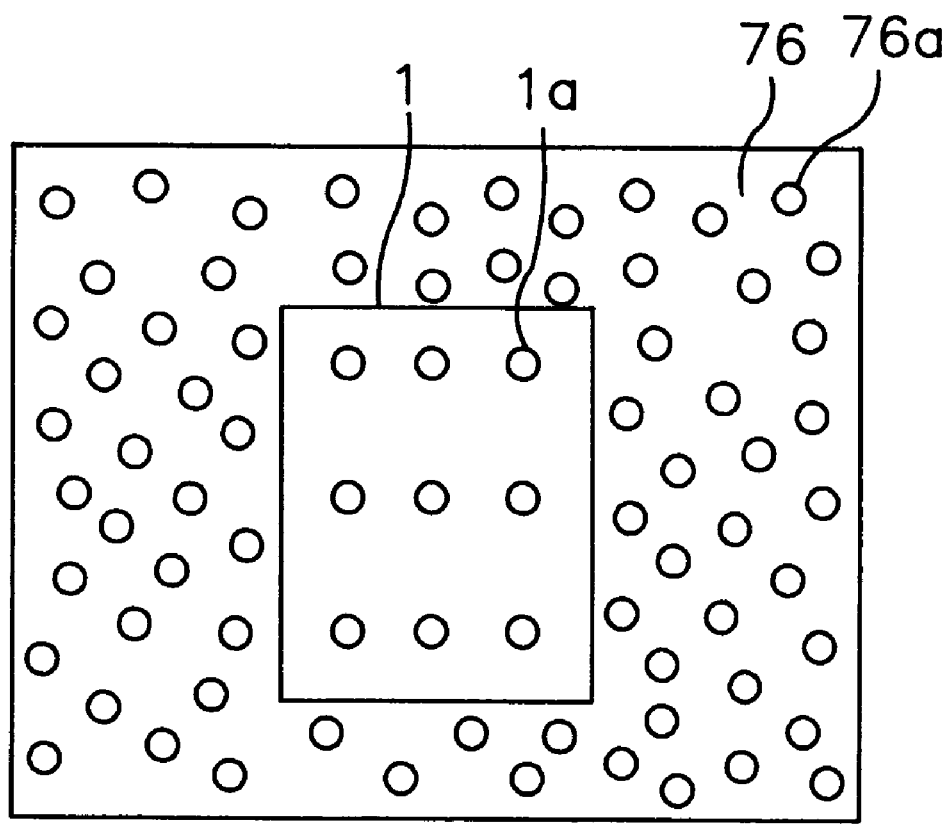
FIG. 2 is a view explaining the image processing of a test object and a background according to the present invention.
Figure 3:
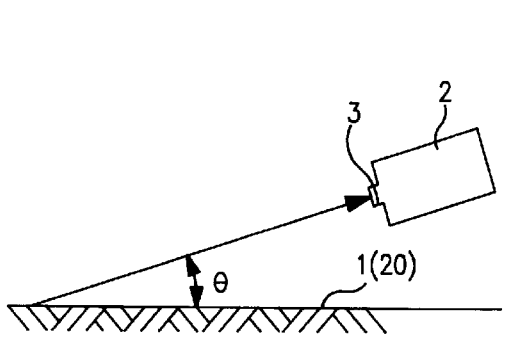
FIGS. 3 and 4 are views explaining the test object.
Figure 4:
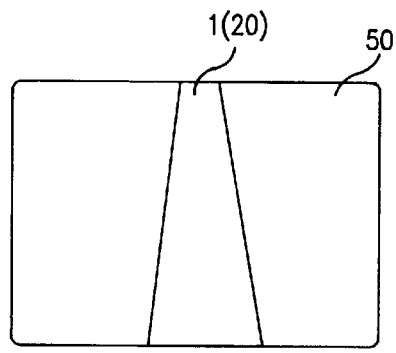

Furthermore, in the image processing method of the present invention, the state of a white line 20, which is the test object 1, for example, moving to this side as shown in FIGS. 3 and 4, is sensed as image information by a plurality of sensors 4, the plurality of the image information signals S1 corresponding to the number of said sensors 4 are outputted and then the image information signals S1 are summed up.

The plural image information signals S1 with the summed number changed in every scanning line are summed, the plural summed signals are subtracted or divided each other and then the subtracted or divided signals are decided or displayed in the decision or display section.

Hereupon, the number of the image information signals S1 to be summed may be predetermined for every scanning line.

Hereupon, the width of test object 1 having a known width may be sensed by the image information signals S1 and then the number of the image information signals S1 to be summed may be set in correspondence to the sensed width.

Figure 5:
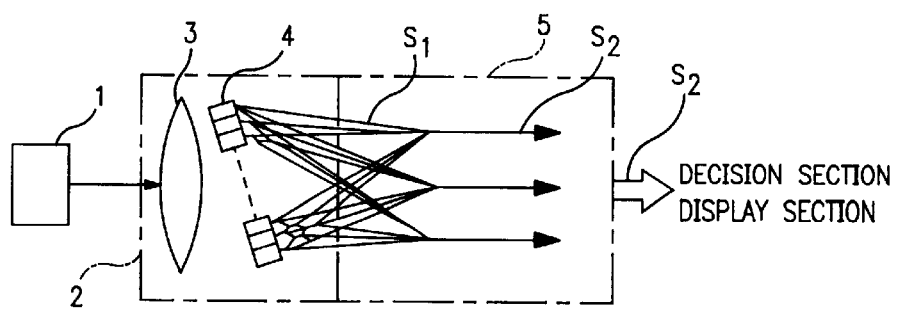
FIG. 5 is a view explaining the image processing method and apparatus according to the present invention.

Furthermore, in another method in accordance with the present invention as shown in FIG. 5, by tilting an array of the sensors 4 relative to the optical axis of the lens 3, the lightness of the white line 20,or the test object 1, which moves towards this side is sensed and the plurality of the image information signals S1 are summed.

Additionally, the image may be processed with the resolution of the camera relative to the test object varied.

Specifically, as shown in FIGS. 1(a), (b) and (c), the image may be processed by varying the distance between the test object 1 and the camera 2, or by varying the resolution of the camera 2 by zoom means not shown.

Also, the image may, of course, be processed with the range to be tested in the test object 1 being shifted.

Also, the image information signals S1 may be with the weights of given image information signals S1 varied.

The term "weight" means a multiplier to be multiplied to the lightness obtained as the image information signals S1.

The important portion of the test object 1 can be sensed well by varying the weight.

Furthermroe, the image information signals S1 outputted from the plurality of the sensors 4 within a speficiedrange may be processed.

Herein, the term "specified range" means that all or a portion of the plurality of the sensors 4 can be selected.

By selecting only a required portion of the plurality of the sensors 4, the state of only a required test range of the test object 1 can be sensed, hereby processing time being reduced.

Additionally, the term "specified range" includes, of course, not only the array of the sensors 4, but also the case where the sensors 4 are gathered in two dimensions.

Still furthermore, the image information signals S1 outputted from the plurality of the sensors 4 continuously arranged are, of course, processed, but the image information signals S1 outputted from the plurality of the sensors 4 discontinuously arranged may be processed.

Furthermore, in another method of the embodiment, the first plural image information signals S1 outputted from the plural sensors 4 within first specified range are summed to make the plural image information signals S1 into first summed signals. The second plural image information signals S1 outputted from the plural sensors 4 within second specified range which is positionally different from the first specified range are summed to make the second plural image information signals S1 into second summed signals. And then the first and second plural summed signals are subtracted or divided each other to make the first and second plural summed signals into subtracted or divided signals S2 and then the subtracted or divided signals S2 are decided or displayed.

The process facilitates the mutual comparison of patterns in the different ranges of the test object 1.

Furthermore, in another method of the embodiment, the first plural image information signals outputted from the plural sensors 4 within specified range are summed to make the first plural image information signals S1 into first summed signals, after previously storing the first summed signals, the second plural image information signals S1 outputted from the plural sensors 4 within the same specified range to make the second plural image information signals S1 into second summed signals, the first and second summed signals are subtracted or divided each other and then the subtracted or divided signals S2 are decided or displayed. Also, by sensing samples and storing them, the comparison between the patterns of the samples and the test object 1 can easily be performed.

Furthermore, in another method of the embodiment, the first plural image information signals S1 outputted from the plural sensors 4 within first specified range are summed to make the first plural image information signals S1 into first summed signals, after previously storing the first summed signals, the second plural image information signals S1 outputted from the plural sensors 4 within the second specified range are summed to make the second plural image information signals S1 into second summed signals, the first and second summed signals are subtracted or divided each other and then the subtracted or divided signals S2 are decided or displayed.

This comparing process facilitates the comparison between the patterns in the different ranges of the test object 1.

Now, the apparatus used for the method according to the present invention will be described.

The image processing apparatus of the present invention as shown in FIG. 1(a) consists of the camera 2 having the plurality of the sensors 4 for sensing the state of the test object 1 as image information through the lens 3 and outputting the image information signals S1 of the number corresponding to the number of the sensors 4, and processing means 5 receiving the plurality of the image infomraiton signalsS1 outputted from the camera 2, summing each of said plurality of the image information signals S1, subtracting or dividing the plural summed signals with each other and outputting the subtracted or divided signals into the decision or display section.

Figure 6:
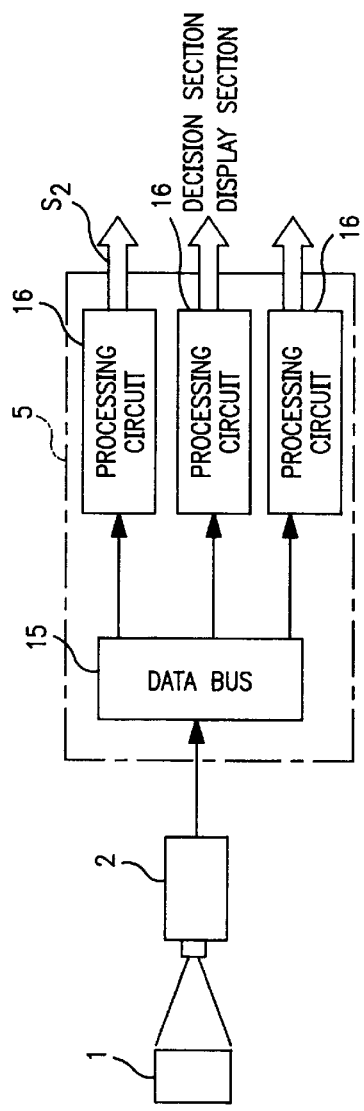

Moreover, in this embodiment, the porcessing means 5 comprises a data bus 15 and a plurality of processing circuits16, as shown in FIG. 6, and processes the signals without varying the distance between the camera 2 and the test object 1, that is, the resolution with respect to the test object 1.

Figure 7:
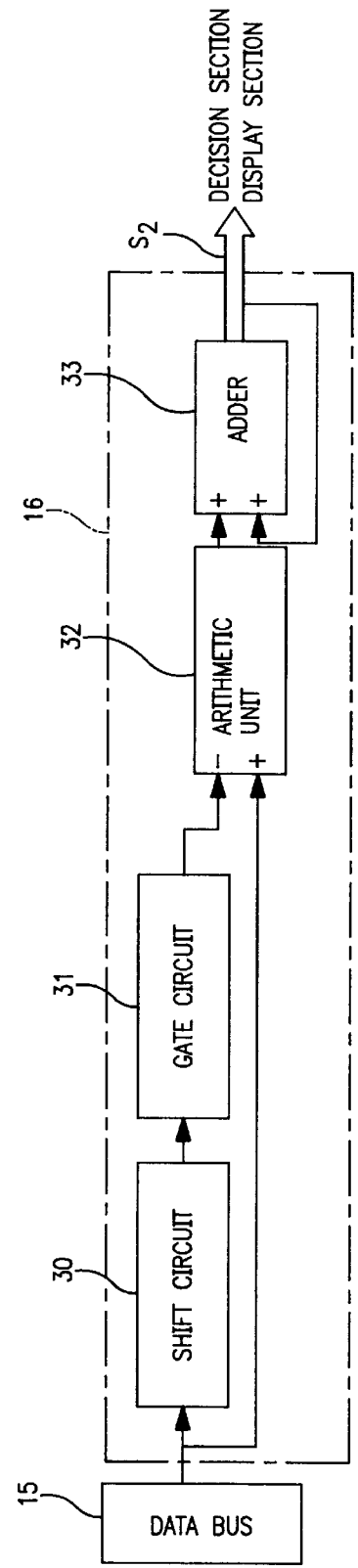

Furthermore, the processing circuit 16 comprises a shift circuit 30, a gate circuit 31, an arithmetic unit 32 and an adder 33, as shown in FIG. 7.

The processing circuit 16 is used in the case where the image information signals of the state on a given line on the test object 1 is summed.

The image information signals are inputted from the data bus 15 to the shift circuit 30 and the arithmetic unit 32 at the lightness tone of eight bits.

The number of shifts in the shift circuit 30 may optionally be set according to the length of the given line to be summed.

The gate circuit 31 holds its output signal at zero value until the number of shifts reaches the number commensurate with the length of the given line preset for the arithmetic unit 32.

During that period of time, the arithmetic unit 32 outputs the image information signals themselves from the data bus 15, and the information corresponding to the number of shifts are integrated by the adder 33 having a feed-back circuit.

After the information signals of the steps commensurate with the length of the given line is inputted, the gate circuit 31 opens its output, and the operation is advanced with the length of the given line held by subtracting, by then rithmetic unit 32 the image information signals before reaching the number of shifts stored in the shift circuit 30.

By the aforesaid construction and operation, the summation in a predetermined scale can be performed in real time.

Figure 8:
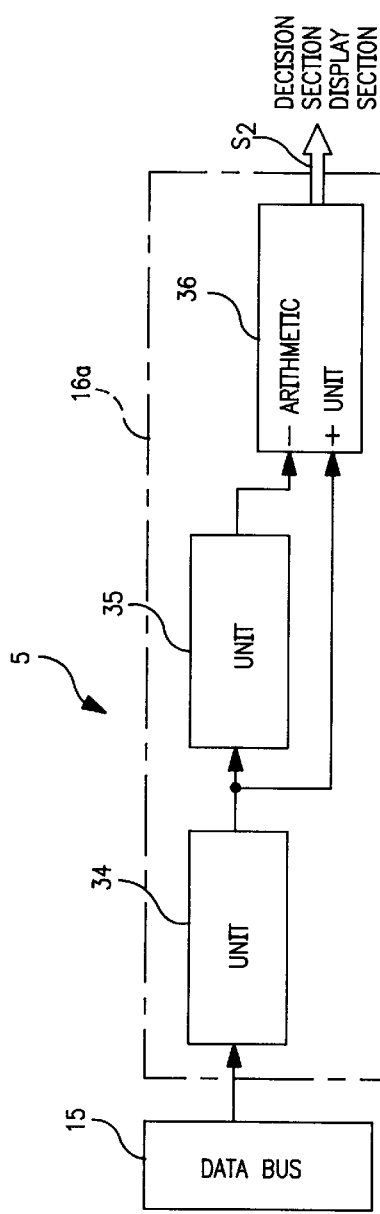

Then, another processing circuit 16a comprises units 34, 35 and arithmetic unit 36, as shown in FIG. 8.

These units 34 and 35 are the same as the processing circuit 16 as shown in FIG. 7 in their construction.

The processing circuit 16a shown in FIG. 8 is used in the case where the summation is performed in real time while correlating the image information signals of the state on the given line on the test object 1.

The image information signals from the data bus 15 is inputted to the unit 34 and the output from the unit 34 is the signal resulting from the summation of the image informaiton signals of the state on the given line on the test object 1.

This output signals are inputted to the unit 35 and further to the arithmetic unit 36.

The inputs of the arithmetic unit 36 consist of two groups of signals: one group is the output signals from the unit 34 which signals are summed on the length of the given line and the other group is the output signals from the unit 35 which signals are taken from the test object in sucession and summed on the length of the given line.

The output signals from the arithmetic unit 36 results in operating the relative relationship between both the signals.

By the above construction and operation, the image processing with respect to objects including the scattering of lightness can be performed in real time.

Figure 9:
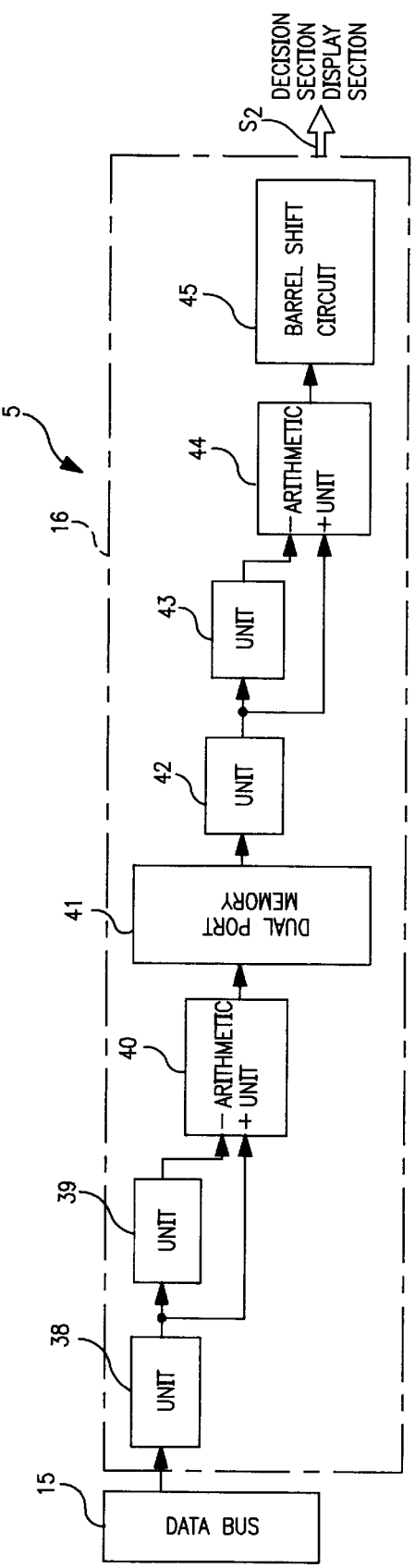

Next, still another processing circuit 16 is composed, as shwon in FIG. 9, of units 38, 39, an arithmetic 40, a dual port memory 41, units 42, 43, an arithmetic unit 44 and a barrel shift circuit 45.

The units 38, 39, 42 and 43 are the same as those of the processing circuit 16 shown in FIG. 7 in their construction.

Furthermore, the processing circuit 16 of FIG. 9 is in its construction and operation the same as the processing circuit 16 consisting of the units 38, 39 and the arithmetic unit 40 shown in FIG. 8 and relatively performs the summation of the image information signals on the given line.

This result is connected to the part consisting of the units 42, 43 and the arithmetic unit 44 and summing the longitudinal line of the image while mapping in the dual port memory 41 in real time.

But this construction the arithmetic unit 44 obtains as its output signals the result of the image information signals in a range defined by a transverse line and the longitudinal line.

The barrel shift circuit 45 sums the image information signals in real time from the operation results in which the number of figures is increased through each operation, by the required number of bits.

Also, furthermore, in performing operation, processing in which weights are changed in real time by operating with preset multipliers through a multiplyer circuit can easily be done.

The processing circuit 16 shown in FIG. 9 is used in the case where the image information signals of the state on the given range on the test object 1 are summed in real time.

Further, another image processing apparatus of the present invention includes, as shown in FIG. 10, comprises the camera 2 including zoom means (not shown) and the processing means 5 for processing the image information signals by changing the resolution by changing the distance between the test object 1 and the sensor 4 as shown in FIGS. 1(a), (b) and (c), and plural memories 22 for storing the plural subtracted or divided signals obtained in accordance with the resolution of the respetive cameras by the processing means 5.

Furthermore, another image processing apparatus of the present invention, as shown in FIGS. 1(a), (b) and (c) and FIG. 11, comprises a plurality, for example, three, of the cameras 2 which are different in their distances relative to the test object 1, or resolution, from each other, the processing means 5 provided in correspondence to each of the cameras 2, and the plurality of memories 22 for storing the plurality of the subtracted or divided signals in accordance with the resolution of the respective cameras.

Between each of the cameras 2 and the test object 1 are provided a total reflection mirror 46, and semi-transparent mirrors 47 and 48.

Figure 12:
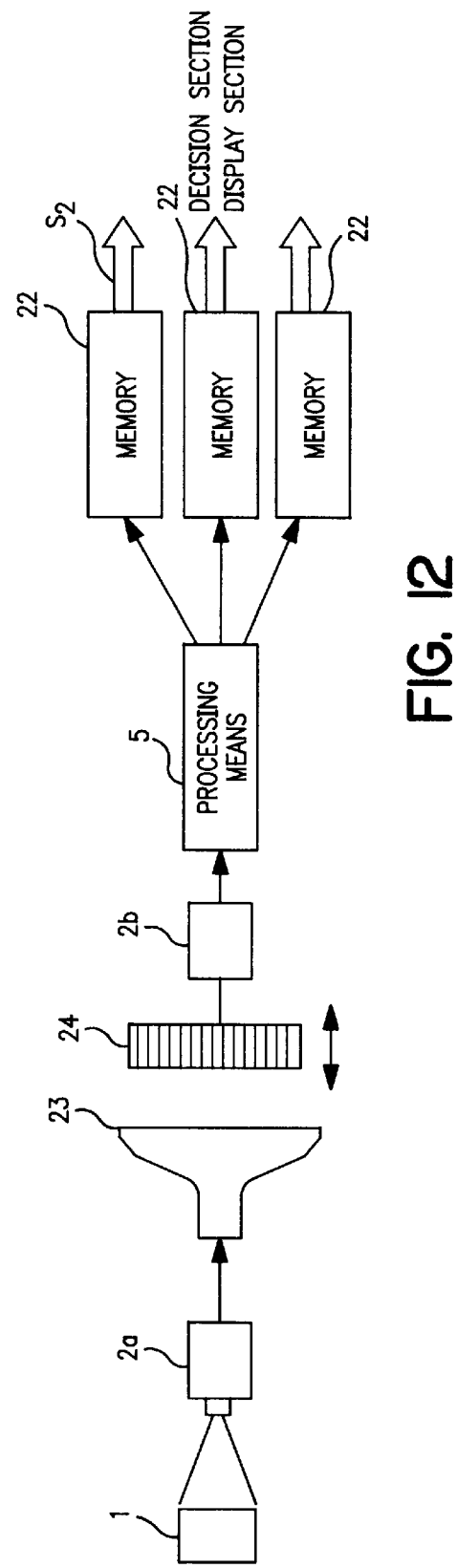
Figure 13:
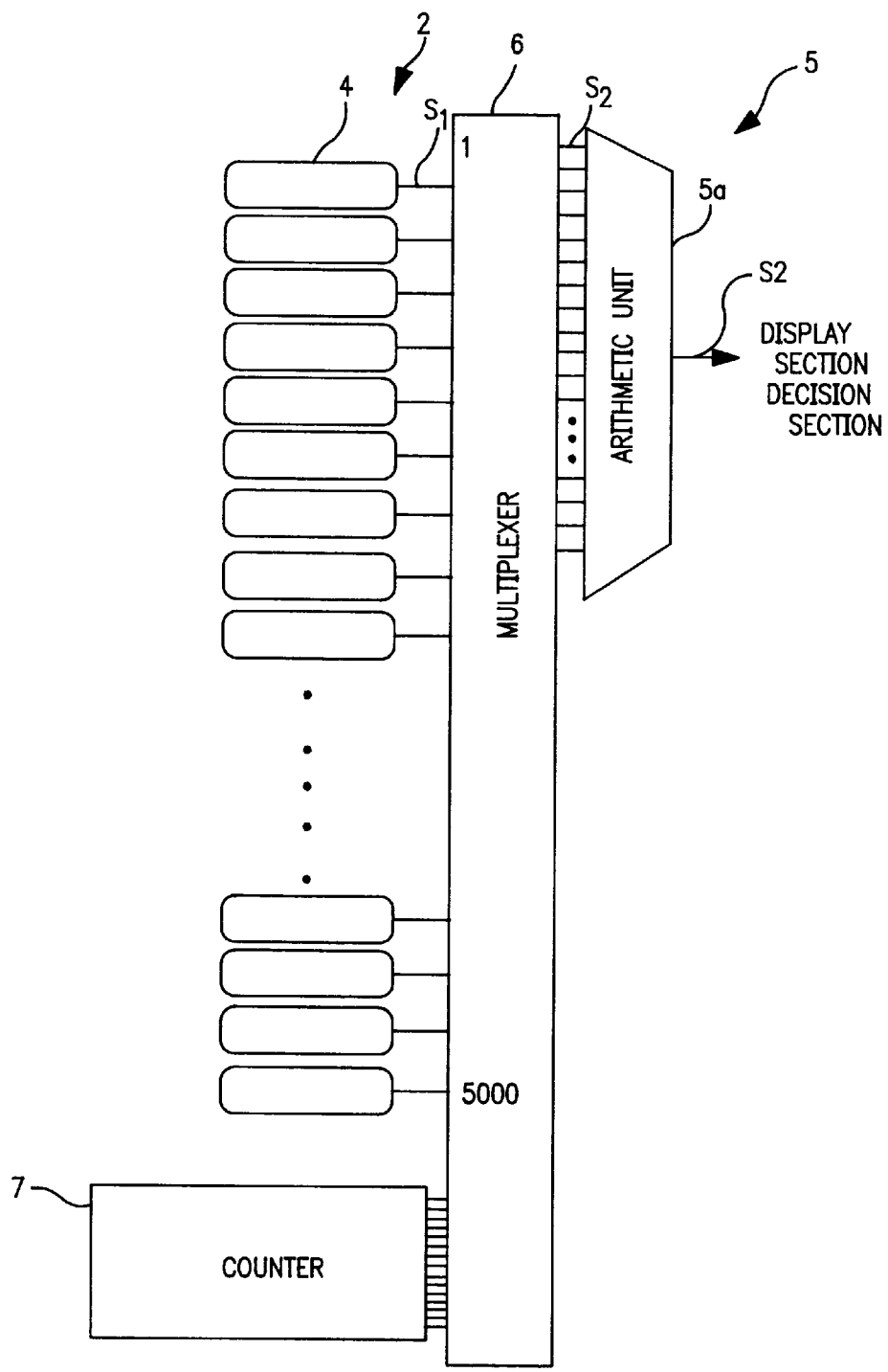

A further image processing apparatus of the present invention, as shown in FIG. 12, comprises a first camera 2a having the plurality of the sensors 4 for sensing the state of the test object 1, as image information and outputting first ima ge information signals corresponding to the number of the sensors 4, a cathode ray tube 23 for displaying an image by means of the image information signals outputted from the first camera 2a, optical fibers 24 having a sensing end facingto the cathode ray tube 23 and adapted to sense the image and make the distance relative to the cathode ray tube 23 variable, a second camera 2b having the plurality of the sensors4 for sensing the image as image information and outputting the second image information signals of the number corresponding tothe number of the sensors 4, processing means 5 receiving the second image information signals from the second camera 2b, summing the plurality of the image information signals within positionally specified range as a single given image information signal and subtracting or dividing the plural summed signals from each other and plural memories 22 for storing the plural subtracted or divided signals from the processing means 5 in response to variation of a distance between the sensing end of the optical fibers 24 and the cathode ray tube 23.

Further, the processing means 5 sums the given image information signals with the multipliers or weights for the image information signals changed.

Figure 15:
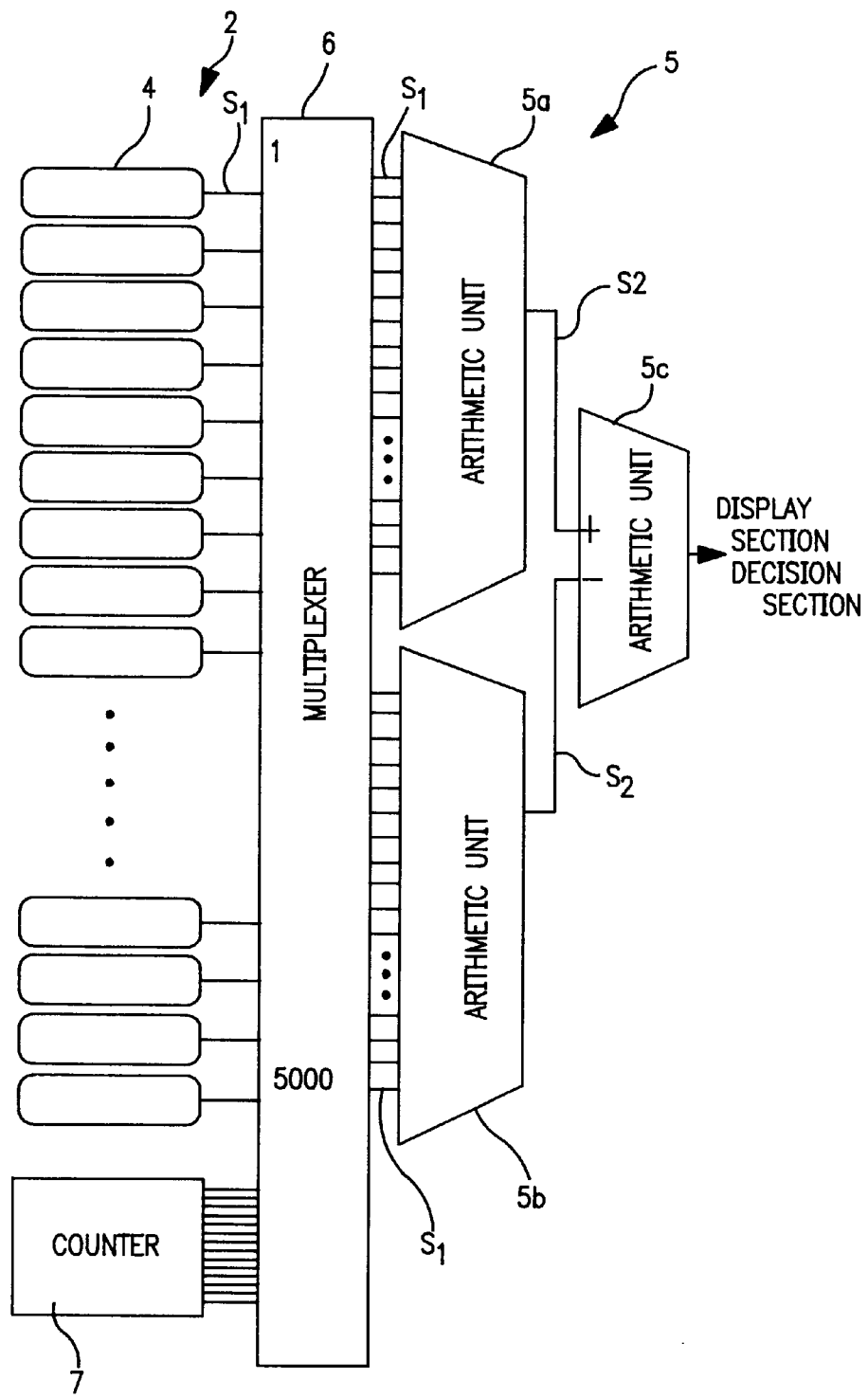

Furthermore, in an embodiment shown in FIG. 15, processing means 5 comprises a first arithmetic unit 5a connected to the first multiplexer 6, summing the first plural image information signals S1 outputted from the plural sensors 4 within first specified range to make the first plural image information signals S1 into first summed signals S2, a second arithmetic unit 5b connected to said first multiplexer 6, summing the second plural image information signals S1 outputted from the plural sensors 4 within the second specified range to make the second plural image information signals S1 into second summed signals S2, and a third arithmetic unit 5c subtracting or dividing the first and second summed signals S2 each other outputted from said first and second arithmetic units 5a and 5b. In this embodiment, the first arithmetic unit 5a and the second arithmetic unit 5b are adding circuits and the third arithmetic unit 5c are adding circuits and the third arithmetic unit 5c is a subtracting or dividing circuit.

Figure 16:
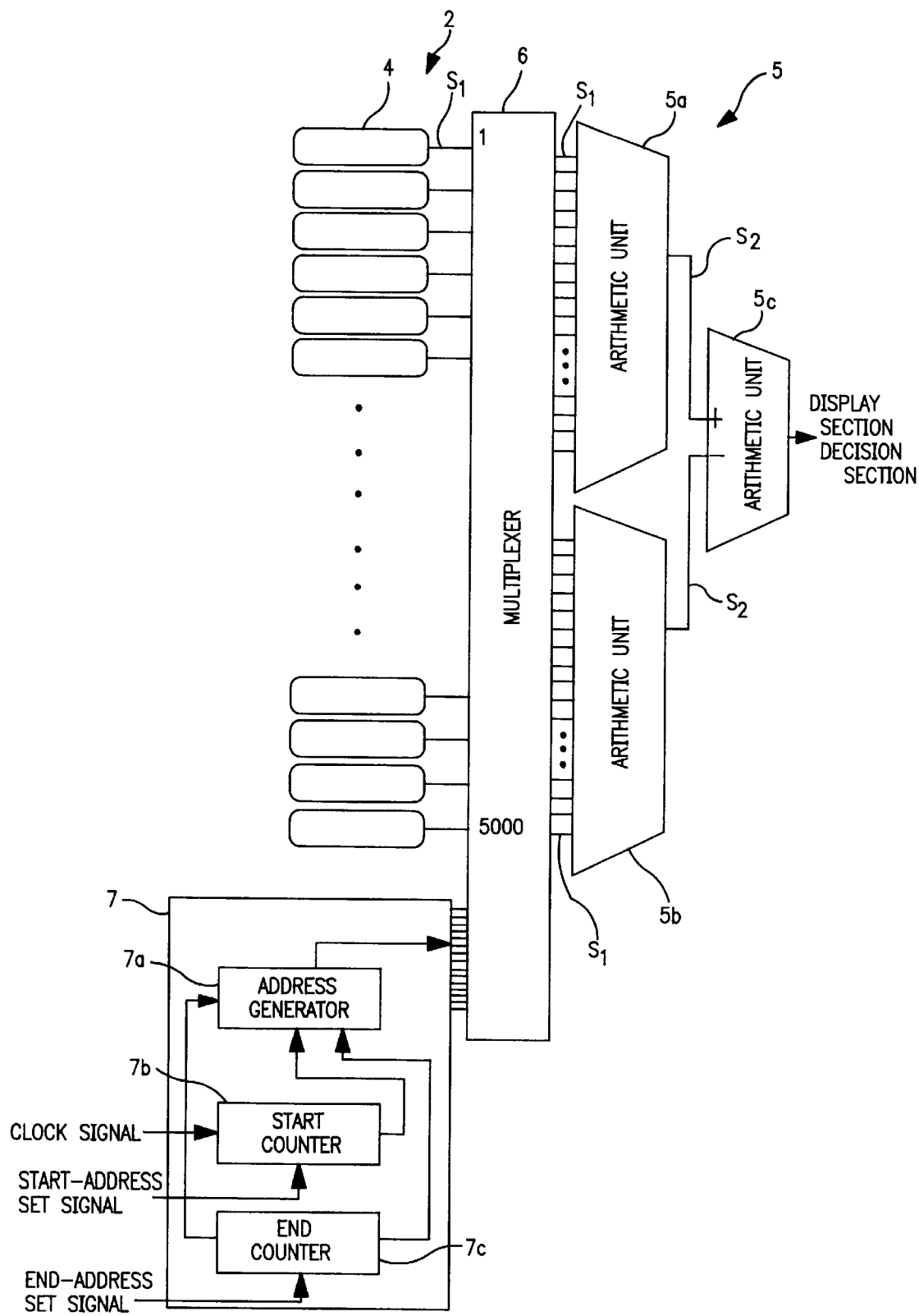
Figure 17:
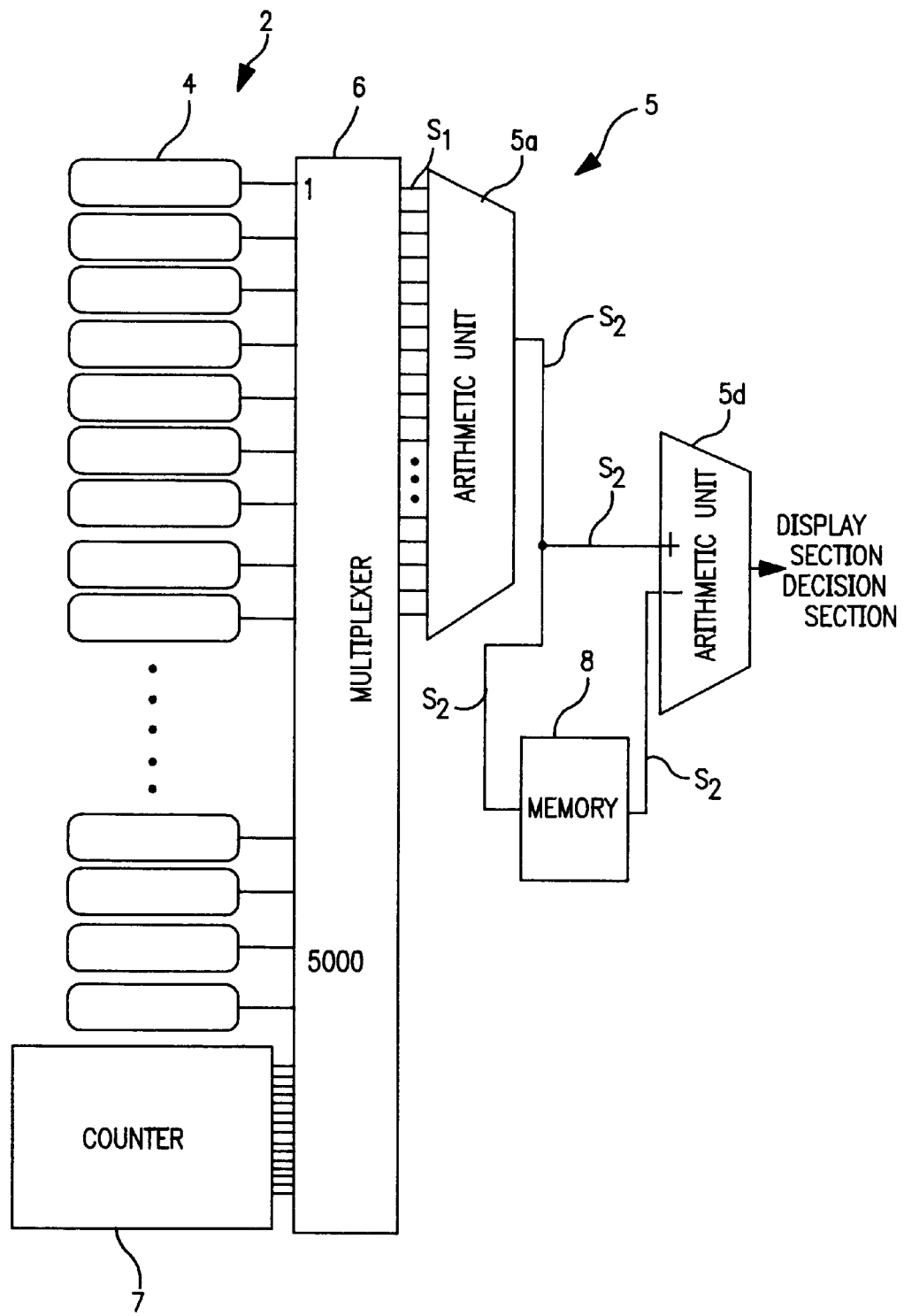
Figure 18:
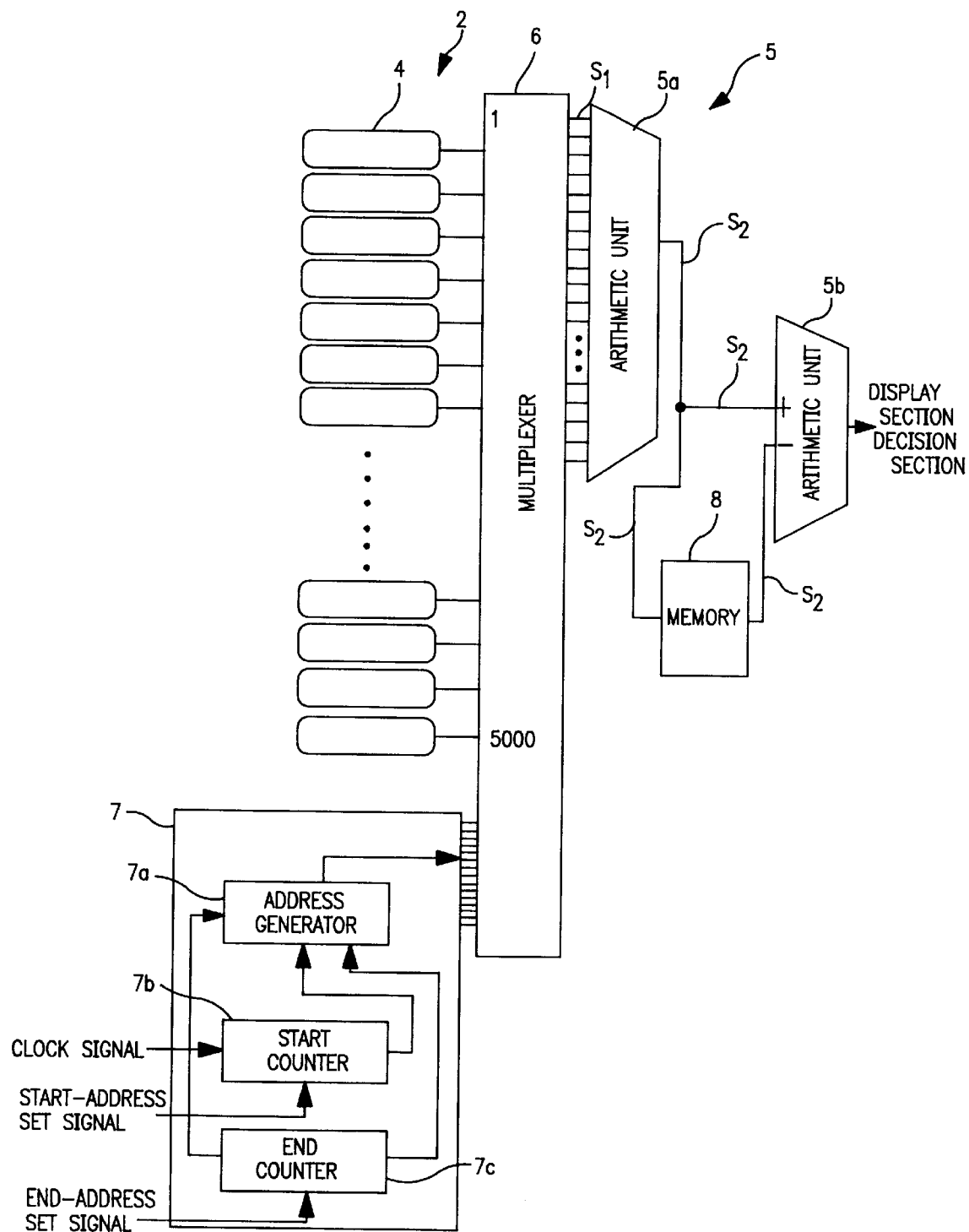
Figure 19:
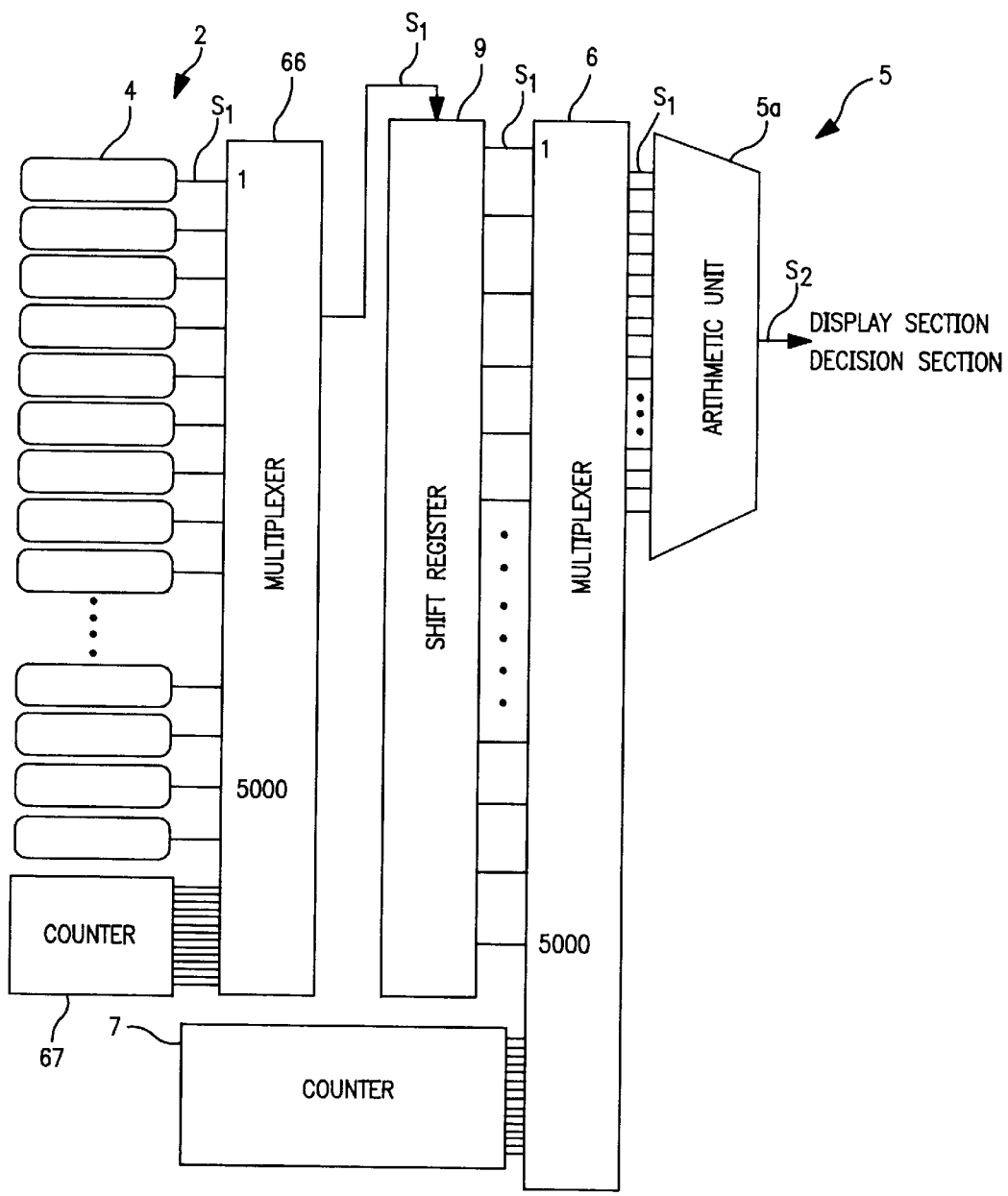
Figure 20:
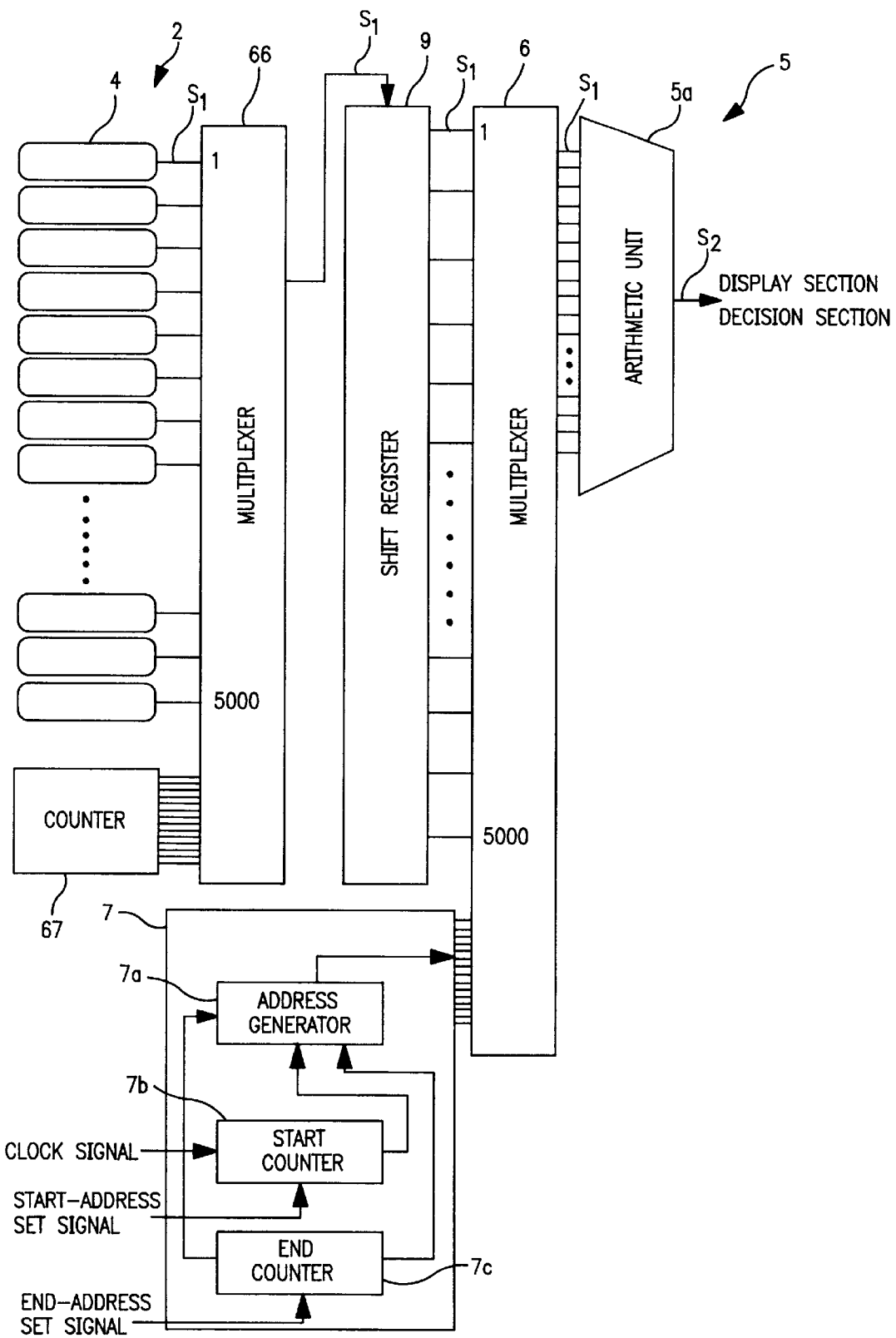
Figure 21:
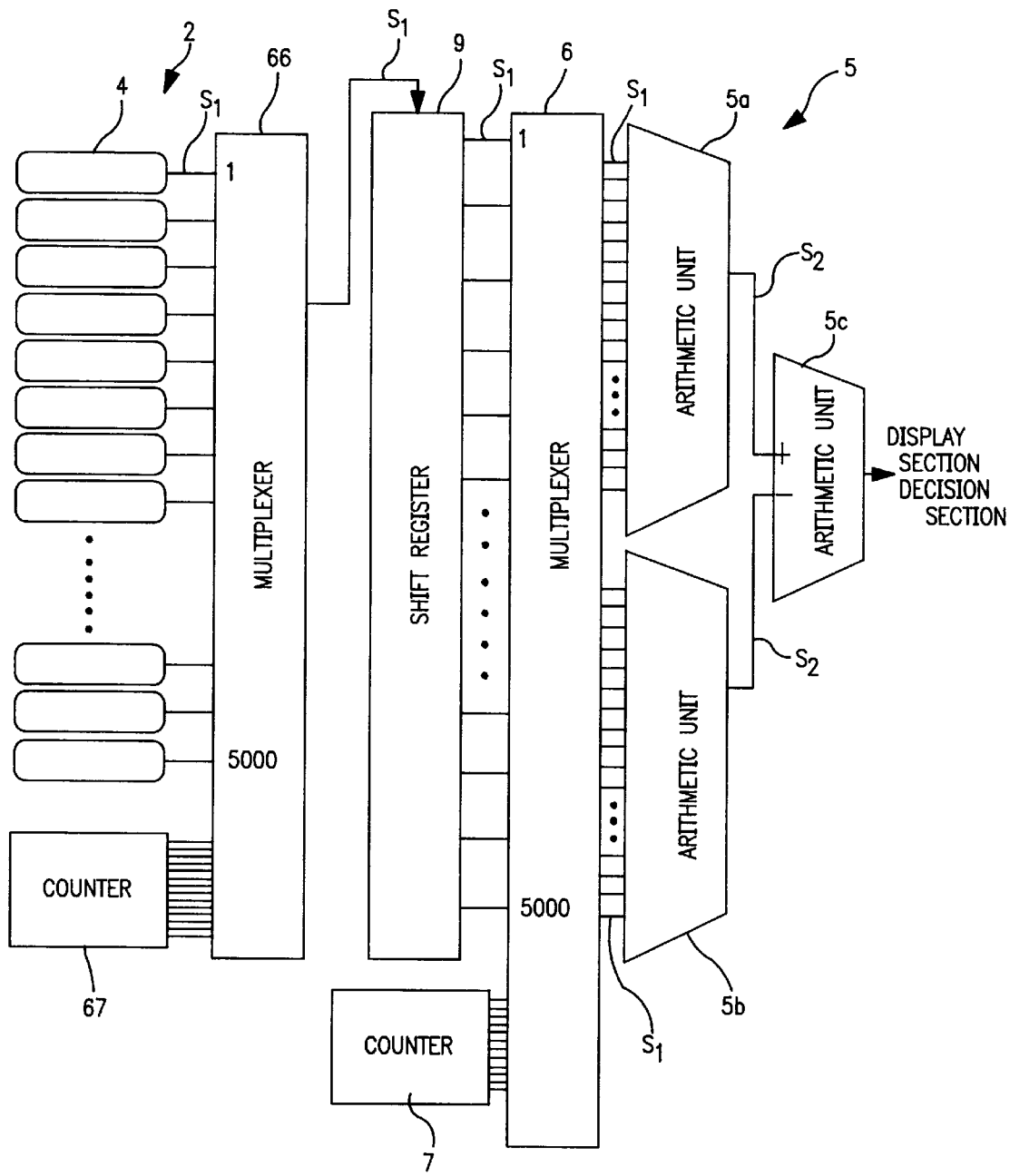
Figure 22:
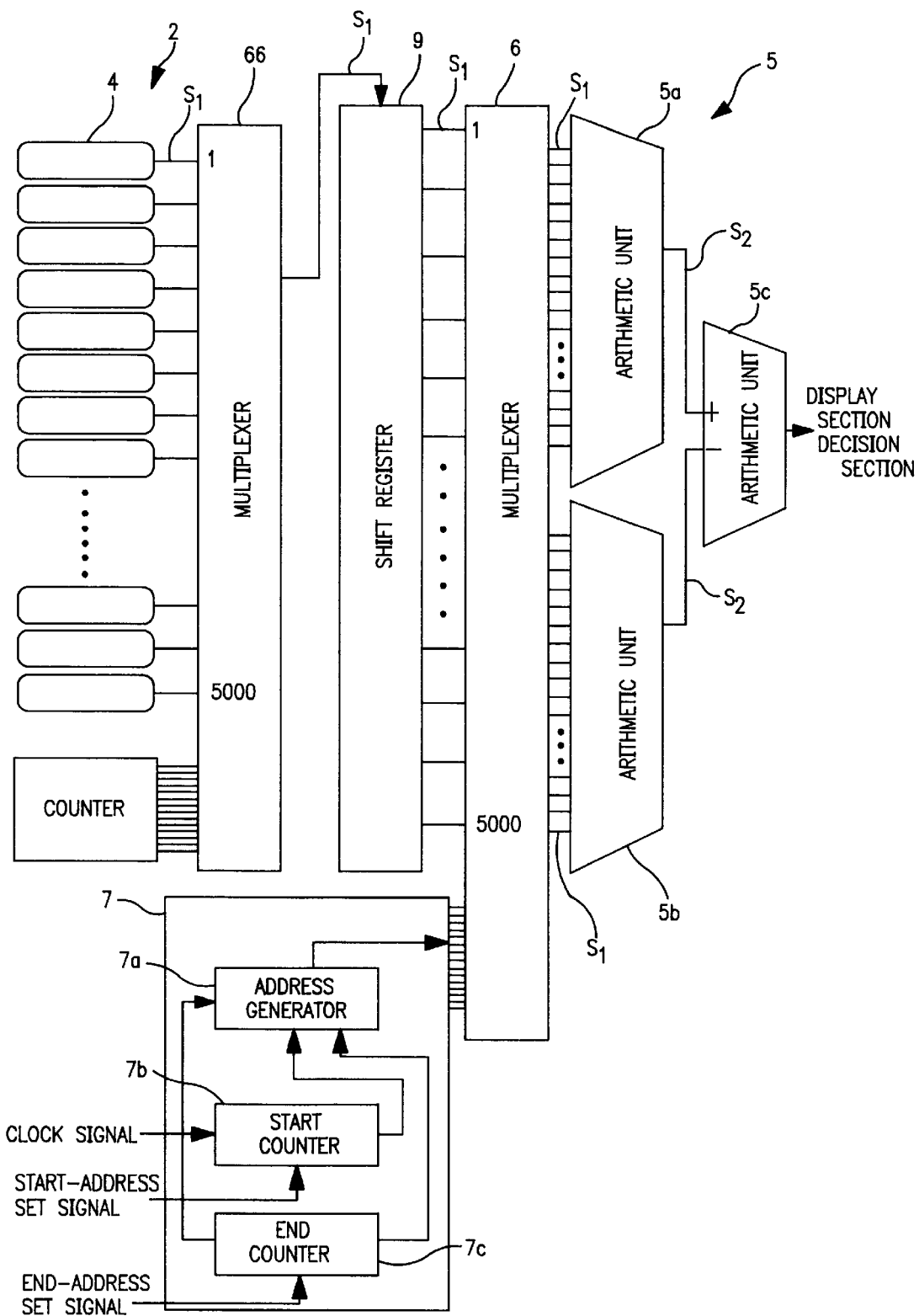
Figure 23:
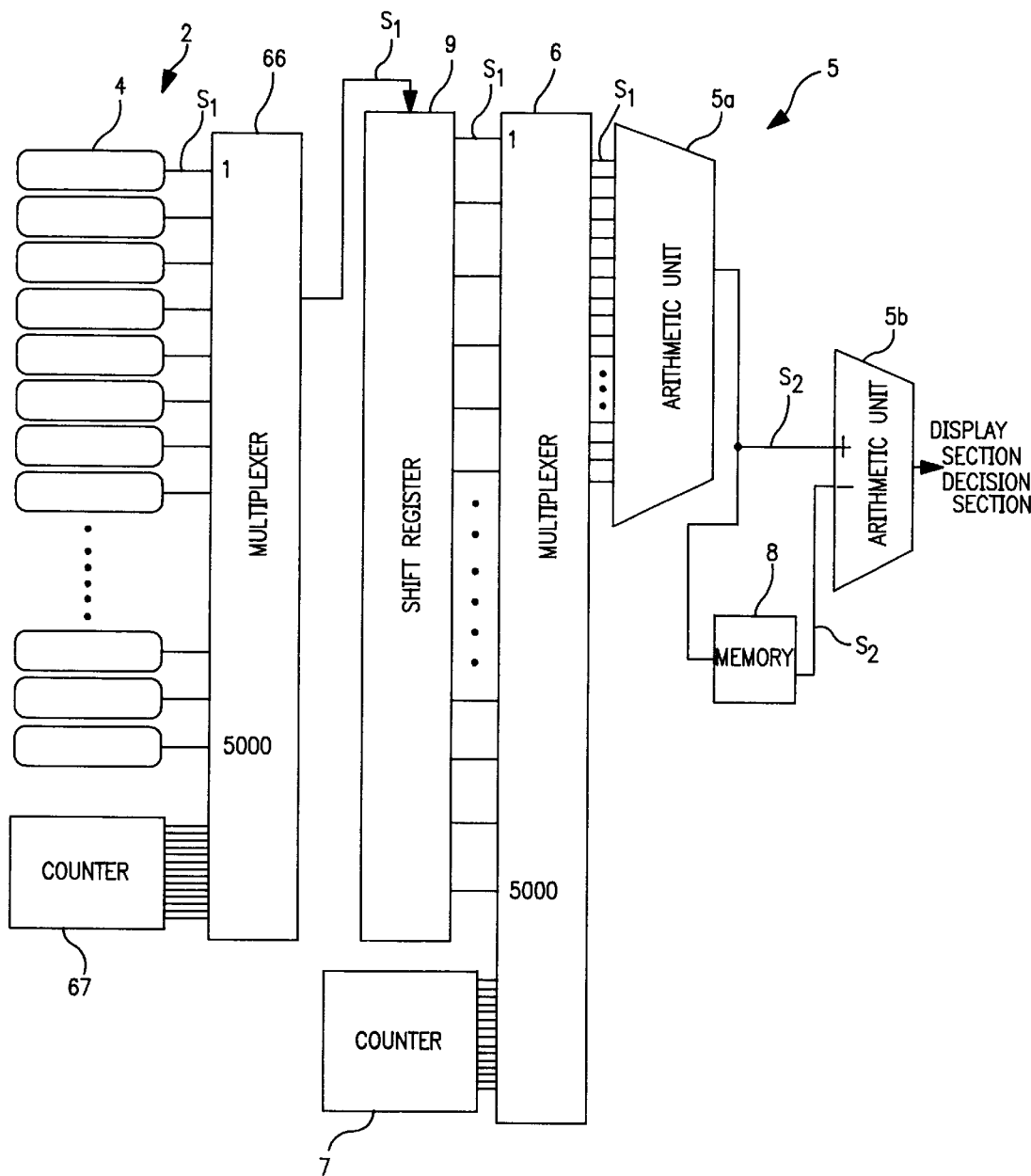
Figure 24:
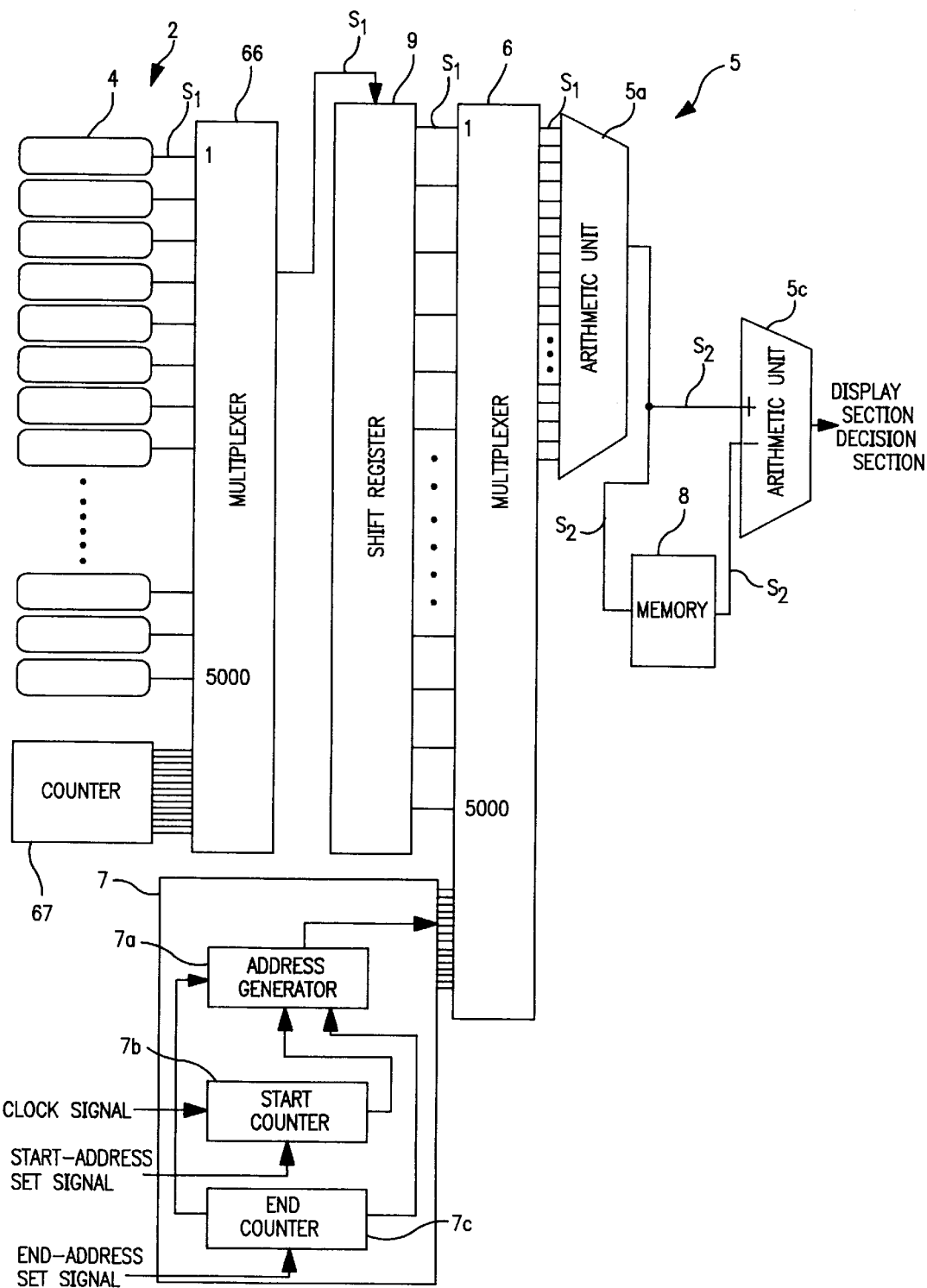

Furthermore, FIG. 16 shows another embodiment. Furthermore, in an embodiment shown in FIG. 17, processing means 5 comprises a first arithmetic unit 5a connected to the first multiplexer 6, summing the first plural image information signals S2, and after storing, summing the second plural image information signals S1 outputted from the plural sensors 4 to make the first plural image information signals S1 into first summed signals S2, a memory 8 for previously storing the first summed signals S1 outputted from the plural sensors 4 to make the second plural image information signals S1 into second summed signals S2 by the first arithmetic unit 5a, and, a second arithmetic unit 5d subtracting or dividing the first and second plural summed signals S2 each other.

In this embodiment, the first arithmetic unit 5a is a adding circuit and the second arithmetic unit 5d is a subtracting or dividing circuit.

FIGS. 18, 21–24 show various embodiments of the invention. Consequently the embodiment shown in FIG. 22 comprises sensors 4 provided in a camera 2 for sensing state of a test object 1 as image information of lightness of the test object 1 through a lens 3 and outputting image information signals S1,
- a first muliplexer 6 receiving simultaneously and in parallel the image information signals S1 outputted from the sensors 4 and outputting the image information signals S1 by means of a first counter 7, the first counter 7 addressing the first multiplexer 6 so that the first multiplexer 6 outputs the image information signals S1 in a sensed specified range, and
- processing means 5 for receiving and processing the image information signals S1 outputted from said first multiplexer 6.

Furthermore the image processing apparatus is characterized in that said processing means 5 comprises, summing the image information signals S1 by arithmetic units 5a and 5b, the image information signals S1 corresponding to the sensed specified range of the test object 1 and outputted from the sensors 4, subtracting the summed signals S2 each other by an arithmetic unit 5c, the summed signals S2 corresponding to the sensed specified range of the test object 1 and outputting the subtracted signals to a display section.

Furthermore a second multiplexer 66 having a second counter 67 is connected to said plural sensors 4, the second counter 67 addressing the second multiplexer 66 so that the second multiplexer 66 outputs the image information signals S1 in the sensed specified range.

A shift register 9 is connected to said second multiplexer 66 to receive the image information signals S1 sequentially in time from said second multiplexer 66 and output the image information signals S1 simultaneously and in parallel.

The first multiplexer 6 is connected to said shift register 9 to receive the image information signals S1 outputted from said shift register 9.

Figure 14:
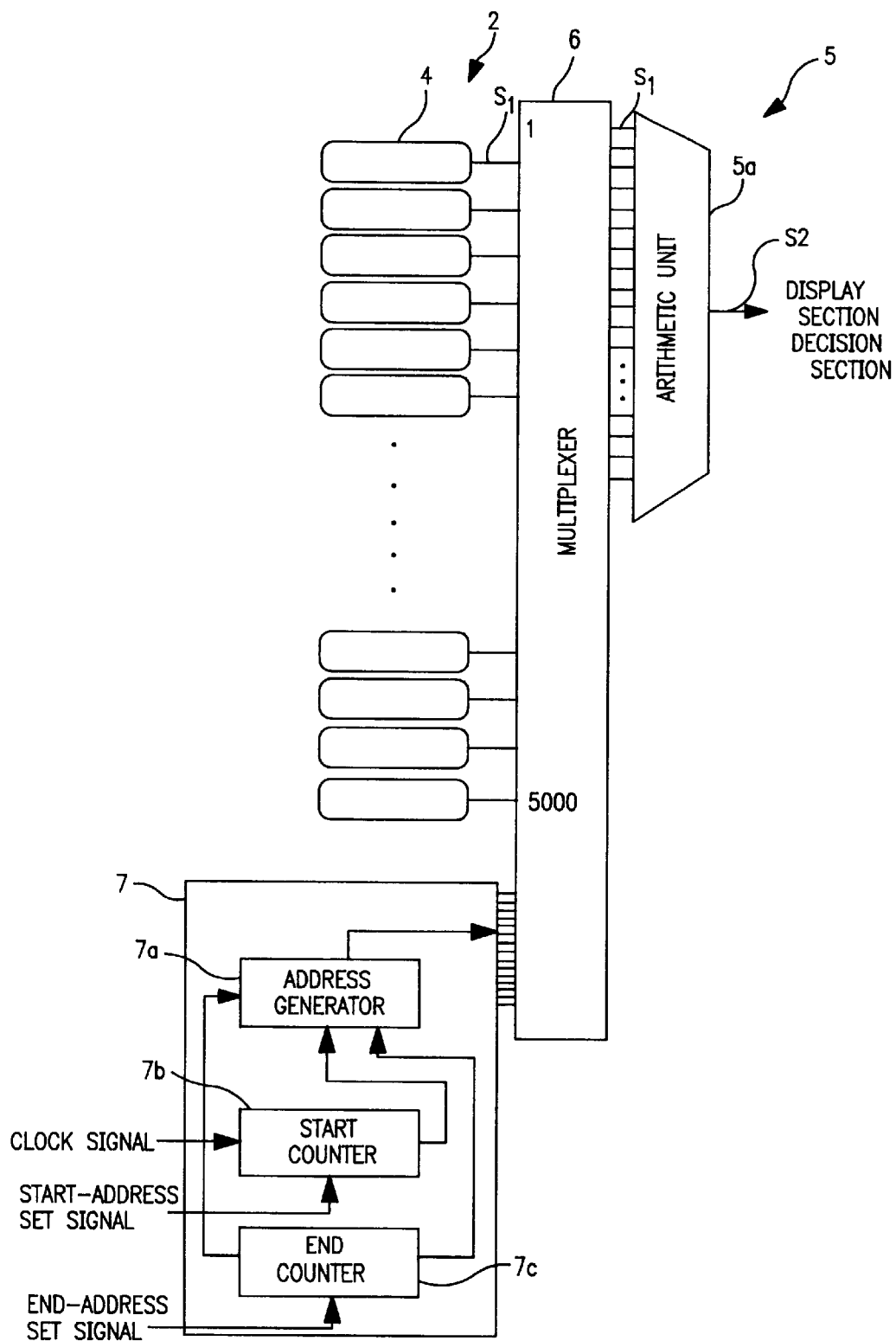

The first counter 7 and the second counter 67 are the same as the counter 7 as already described in the embodiment shown in FIG. 14.

Figure 26:
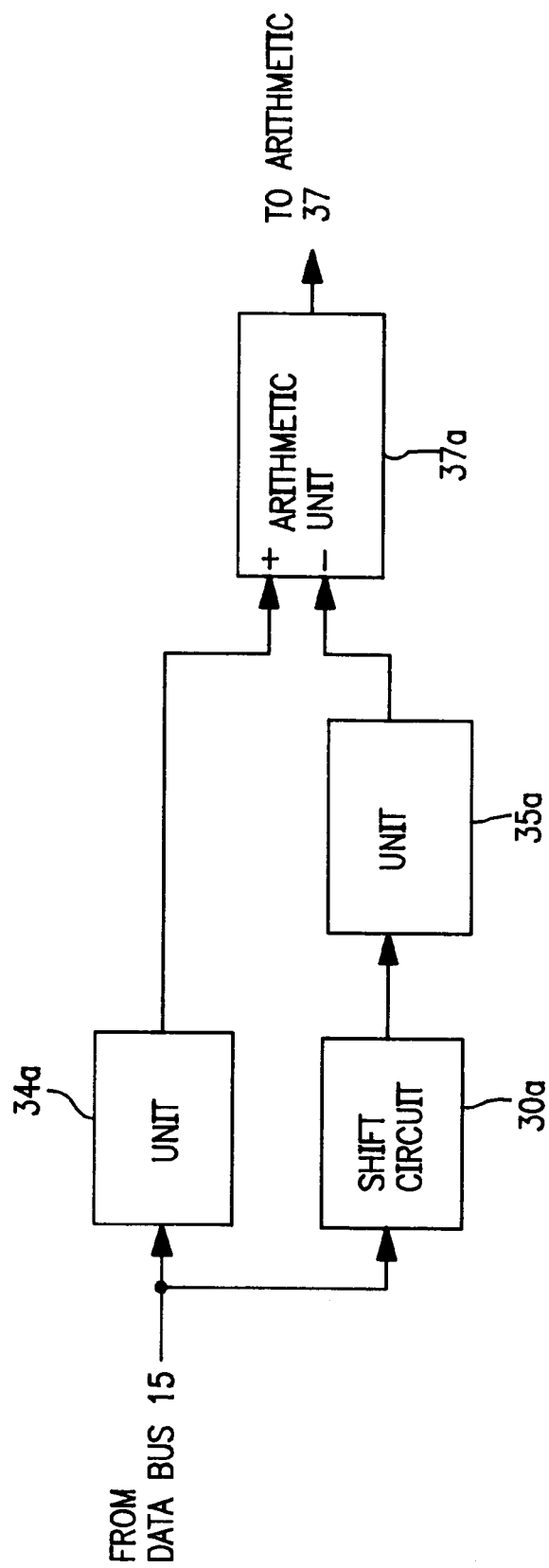

Furthermore, in an embodiment shown in FIGS. 25 and 26, the apparatus 5 comprises a camera 2 having a plurality of sensors 4 for sensing state of a test object 1 as image information through a lens 3 and outputting image information signals S1 of the number corresponding to the number of said sensors 4, and processing means 5 receiving said image information signals S1 outputted from said camera 2, summing more of the plural image information signals S1 to make the plural image information signals S1 into first summed signals S2a, subtracting or dividing the first plural summed signals S2a each other to make the first plural summed signals S2a into first subtracted or divided signals S2, summing less of the plural image information signals S1 to make the plural image information signals S1 into second summed signals S2b, subtracting or dividing the second plural summed signals S2b each other to make the second plural summed signals S2b into second subtracted or divided signals S2, and, deciding or displaying the first and second subtracted or divided signals S2 simultaneously and in parallel in the decision or display section.

In embodiments shown in FIGS. 15, 16, 17, 18 and 21 to 24, a first counter 7 is adapted to address a first multiplexer 6 so that the first multiplexer 6 outputs the image information signals in a sensed specified range. Specifically, the first counter 7 comprises an address generator 7a, a start counter 7b and an end counter 7c, and counts by clock signals and addresses the first multiplexer 6 by a start address set signal and an end address set signal. A second counter 67 is adapted to address a second multiplexer 66 so that the second multiplexer 66 outputs the image information signals in the sensed specified range.

The processing means 5 is shown in FIG. 25. A data bus 15 is connected to the sensors 4 of the camera 2 (not shown), said data bus 15 being connected to a processing circuit 16.

Furthermore, the processing circuit, 16 consists of a shift circuit 30, a gate circuit 31, an arithmetic unit 32 and an adder 33.

Furthermore, the adder 33 is connected to an arithmetic unit 37.

The image information signals S1 are inputted from the sensors 4 of the camera 2 through the data bus 15 to the shift circuit 30 and the arithmetic unit 32 in, for example, the lightness tone of eight bits.

The number of the image information signals S1 to be summed is set by the shift circuit 30.

The gate circuit 31 holds an output signal 0 with respect to the arithmetic unit 32 until the gate circuit reaches the number of shifts corresponding to the number of the image information signals to be summed.

During the holding time, the output of the AU 32 outputs the image information signals S1 themselves from the data bus 15 to the adder 33 having a feedback circuit by which adder the image inforamtion corresponding to the set number of shifts is accumulated.

The gate circuit 31 opens its output after the image information signals S1 of the number to be summed have been inputted to the gate circuit 31, and at the arithmetic unit 32 the image information signal S1 before reacing the number of shifts set by the shift circuit 30 is substracted from the output of the gate circuit 31, whereby the operation is advanced to sum the image information signals S1 while holding the number of the image information signals S1 to be summed.

As a result, the processing circuit 16 outputs to the arithmetic unit 31 the first summed signal S2a derived from more of the image information signals S1 on a scanning line on the test object 1.

Next, a processing circuit 16a consists of units 34 and 35 and an arithmetic unit 36.

The units 34, 35 has the same construction as that in the processing circuit 16.

The image information signals from the data bus 15 are inputted to the unit 34 whose output signals are signals obtained by summing the image information signals S1 on the same test object 1.

These output signals are inputted to the units 35 and further to the arithmetic unit 36.

The inputs into the arithmetic unit 36 are two groups of signals, one group of output signals, which are summed signals, from the unit 34 and the other group of output signals, which are also summed signals, from the unit 35. Furthermore, the arithmetic unit 36 outputs to the arithmetic unit 37 second summed signals S2b derived from the less of the image information signals S1.

The arithmetic unit 37 subtracts and divides the first plural summed signals S2a each other to make the first plural summed signals S2a into first subtracted or divided signals S2, subtracts or divides the second plural summed signals S2b each other to make the second plural summed signals S2b into second subtracted or divided signals S2, and, outputs the first and second subtracted or divided signals S2 into the decision or display section in order to decide or display the first and second subtracted or divided signals S2 simultaneously and in parallel.

In this embodiment, the arithmetic unit 36 is an adding circuit and the arithmetic unit 37 is a subtracting or dividing circuit.

Furthermore, the processing circuit 16a may be constructed in a same way to the processing circuit 16.

Further, the processing circuit 16 may, as shown in FIG. 26, be comprised of a unit 34a, an arithmetic unit 31a, a shift circuit 30a, and a unit 35a.

The data bus 15 is connected to the unit 34a and the unit 34a is connected to the arithmetic unit 37a.

The data bus 15 is further connected to the arithmetic unit 37a through the shift circuit 30a and the unit 35a. The arithmetic unit 37a is, further, connected to the arithmetic unit 37. The number of shifts in the shift circuit 30a is set to, for example, two times the number of shifts in the shift circuit 30.

Both the units 34a and 35a is constructed in a same way to those of the processing 16 shown in FIG. 25.

Alternatively, both the processing circuits 16 and 16a shown in FIG. 25 may be constructed as shown in FIG. 26.

The camera 2 may be provided with a zoom mechanism (not shown) changing the resolution relative to the test object 1.

Alternatively, the plurality of the cameras 2 may be positioned at the different distances from the test object 1 to provide the different resolutions.

The image processing apparatus may be constructed so as to process the information with the test range of the test object 1 being moved by moving the camera 2.

Moreover, the processing means 5 may be constructed so as to sum the specified image information signals S1 with their weights, that is, multipliers, being varied.

Alternatively, the processing means 5 may be constructed to process the image information signals S1 outputted from the plurality of the sensors 4 within the specified range.

Furthermore, the processing means 5 may be constructed to process the image information signals S1 outputted from the plurality of the sensors 4 arranged continuously.

Furthermore, the processing means 5 may be constructed to process the image information signals S1 outputted from the plurality of the sensors 4 arranged discontinuously.

The image processing apparatus of the present invention as shown in FIG. 1(a) comprises a camera 2 having plural sensors 4 for sensing state of a test object 1 as image information through a lens 3 and outputting image information signals S1 of the number corresponding to the number of said sensors 4, and processing means 5 receiving said image information signals S1 outputted from the sensors 4 of said camera 2, summing said plural image information signals S1 with the summed number changed in every scanning line, subtracting or dividing the plural summed signals each other and outputting the subtracted or divided signals S2 to the decision or display section.

Hereupon, the processing means 5 may be constructed so as to preset the number of the image information signals S1 to be summed in every scanning line.

Hereupon, the processing means 5 may be constructed so as to sense the width of the test object whose width is known by the image information S1 and vary the number of the image information signals S1 to be summed in every scanning line in response to said sensed width.

Figure 27:
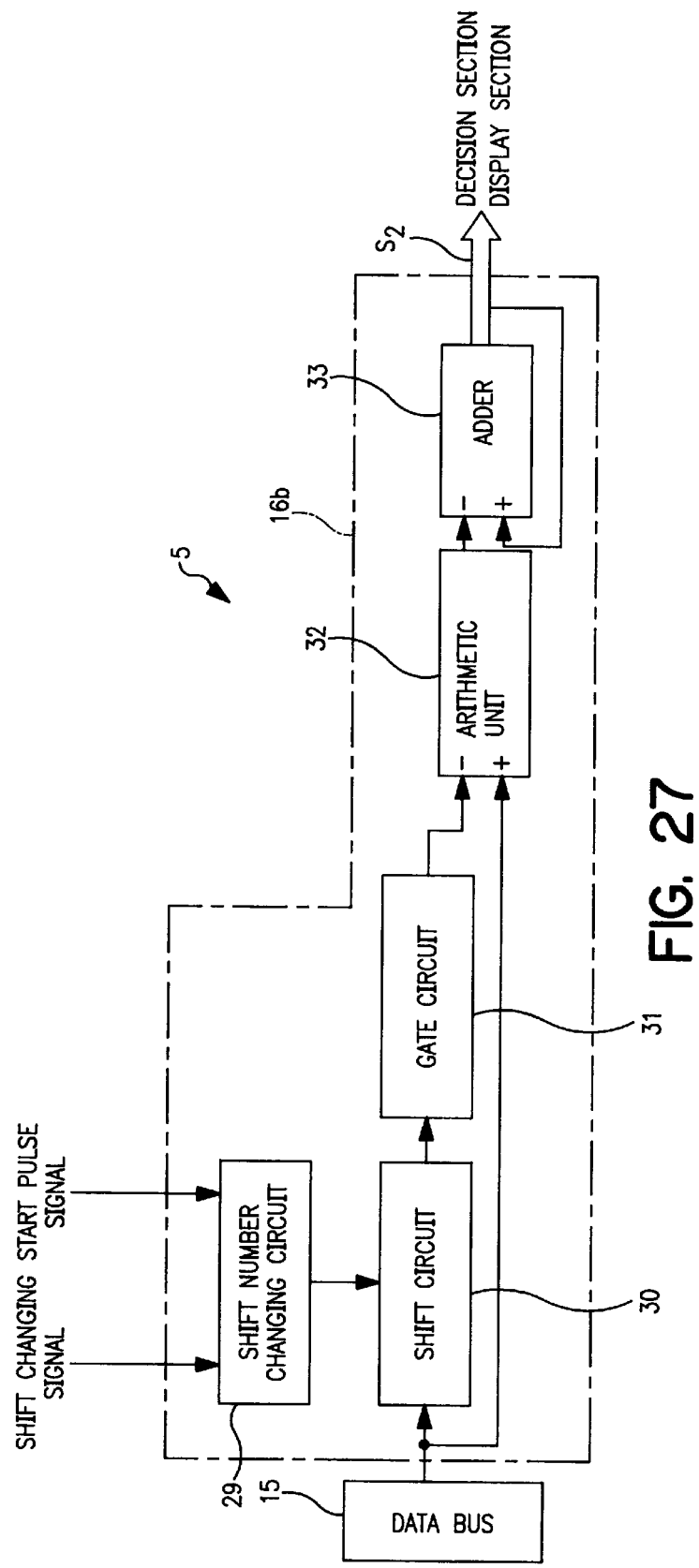
Figure 28:
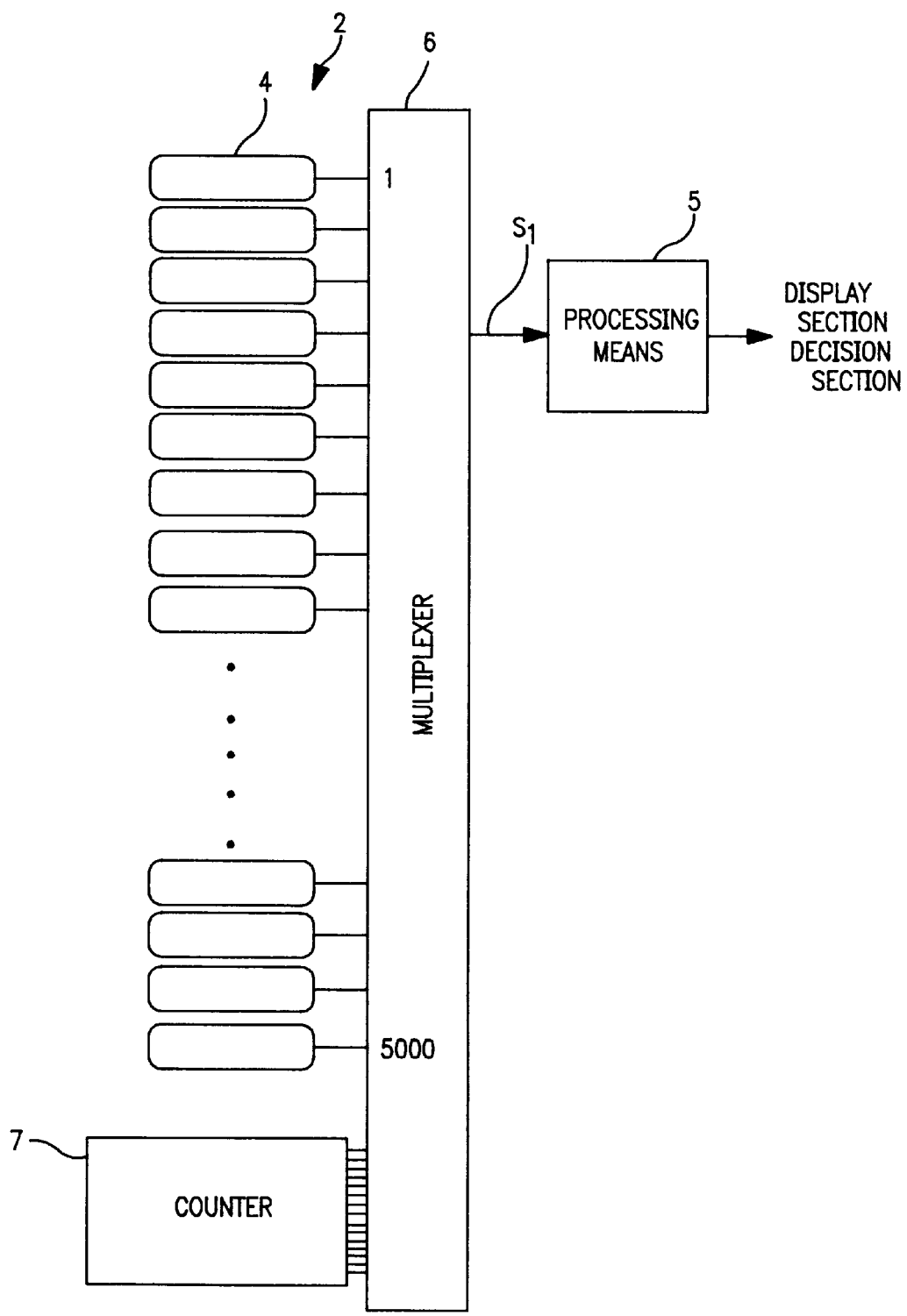
FIGS. 28 and 29 are views explaining apparatuses of the prior art.
Figure 29:
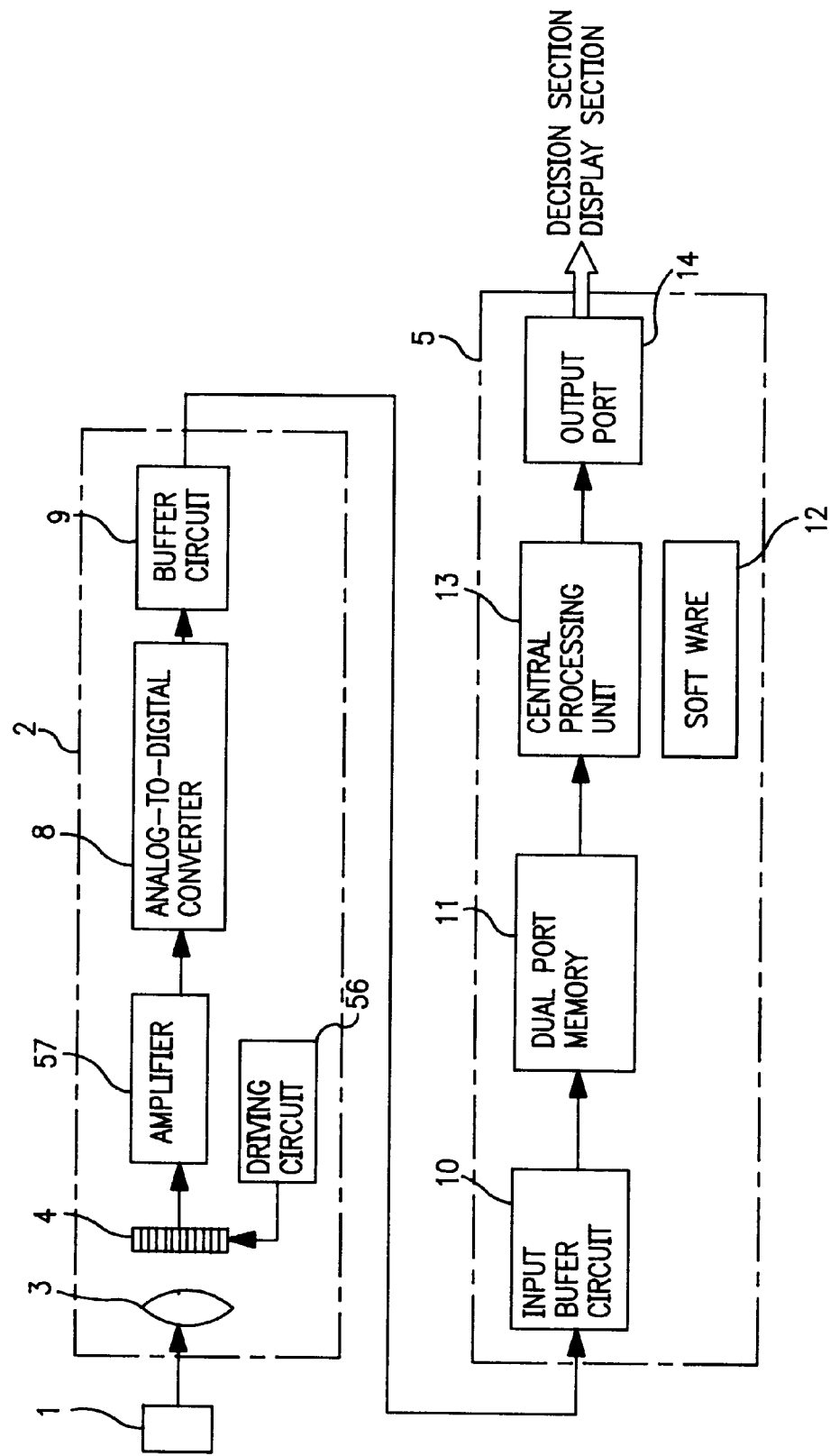
Figure 30:
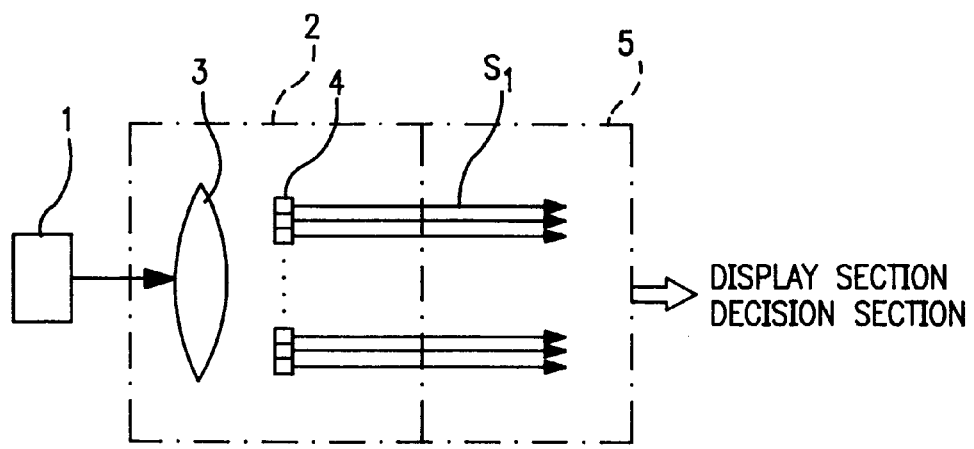
FIG. 30 is a view explaining a method and apparatus of the prior art.

Furthermore, in this embodiment,the processing means 5 comprises,as shown in FIG. 27, the date bus 15 connected to the sensors 4 of the camera 2 shown in FIG. 1(a) and the processing circuit 6. The sensors 4 consist of, for example, 5,000 sensors and sense lightness at 5,000 points. Data at each of the points are outputted in the time sharing mode by the multiplexer(not shown) and inputted into the date bus.

And, the processing sircuit 16 consists of a shifting number changing circuit 29, a shift circuit 30, a gate circuit 31, an arithmetic unit 32 and an adder 33.

This processing circuit 16 sums the image information signals S1 on the scanning lines on the test object 1.

The image information signals S1 are inputted from the sensors 4 of the camera 2 to the shift circuit 30 and the arithmetic unit 32 through the data bus 15 in the eight bits of lightness tones.

The shifting number varying circuit 29 activates the shift circuit 30 by a start pulse signal, and varies the shifting number in the shift circuit 30, that is, the number of the image information signals to be summed, by a shift changing signal between one and one thousand in every scanning line.

The gate circuit 31 holds the output signal 0 to the arithmetic unit 32 until the shifting number reaches the number corresponding to the number of the image information signals S1.

During that period, the arithmetic unit 32 outputs the image information signals S1 themselves from the data bus 15 and the image information signals S1 for the shiftng number are accumulated by the adder 33 having its feedback circuit.

After receiving the predetermined number or the shifting number of the image information signals S1, the gate circuit 31 opens its output, and operation is advanced with the summing number of the image information signals S1 held by subtracting the image information signals S1 by the arithmetic unit 32 before reaching the number of shifts specified by the shifting number changing circuit 29 and stored in the shift circuit 30.

Then, as shown in FIG. 8, another processing circuit 16a comprises units 34, 35 and an arithmetic unit 36.

These units 34 and 35 are the same as the processing circuit 16b shown in FIG. 27 in their construction.

The processing circuit 16a shown in FIG. 8 is used in the case where the summation is performed in real time while correlating the image information signals S1 on the given line on the test object 1.

The image information signals from the data bus 15 are inputted to the unit 34 and the output from the unit 34 are the signals resulting from the summation of the image information signals S1 on the scanning line on the test object 1.

These output signals are inputted to the unit 35 and further to the arithmetic unit 36.

The inputs of the arithmetic unit 36 consist of two groups of signals: one group is output signals from the unit 34 which signals are summed signals and the other group is output signals from the unit 35 which signals are summed signals.

The output of the arithmetic unit 36 results in operating of the relative relationship between both the output signals.

By the above construction and operation, the image processing with respect to the test objects including the variation of lightness can be performed in real time.

Next, still another processing circuit 16 is, as shown in FIG. 9, comprised of units 38, 39, an arithmetic unit 40, a dual port memory 41, units 42, 43, and an arithmetic unit 44.

These units 38, 39, 42 and 43 are the same as those of the processing circuit 16b shown in FIG. 27 in their construction.

Furthermore units 38,39 and arithmetic unit 40 are the same as those of the processing circuit 16b shown in FIG. 16b in their construction and operation and reratively perform the summation of the image information signals on the scanning line.

This result is connected to the part consisting of the units 42, 43 and the arithmetic unit 44 and summing the longitudinal scanning line of the image information signals while mapping in the dual port memory 41 in real time.

By this constructin the arithmetic unit 44 obtains as its output signals the result of the image information signals in the range defined by transverse and longitudinal scanning lines.

The processing circuit 16b shown in FIG. 27 is used in the case where the image information signals on the specified range on the test object 1 is summed in real time.

Also, as shown in FIG. 5 the image processing apparatus comprises a camera 2 having plural sensors 4 for sensing state of a test object 1 as image information through a lens 3 whose optical axis is tilted relative to arrays of the sensors 4, and outputting image information signals S1 of the number corresponding to the number of the sensors 4, and processing means receiving the image of the sensors 4, and processing means receiving the image information signals S1 outputted from the camera 2, summing said plural image information signals S1, subtracting or dividing the plural summed signals each other and outputting the subtracted or divided signals S2 to the decision or display section.

In all of the above embodiments, the sensor is not limited to the optical sensor, but includes all the types of sensors detecting the states of the objects, such as pressure, temperature and humidity sensors.

Furthermore, while in the above embodiments the image information sensing means uses the plurality of the sensors, a single sensor may be used by using mechanical scanning means, such as a vibrating mirror or multi-side mirror, to scan.

INDUSTRIAL APPLICABILITY

The present invention is used in products inspection process sensing the presence of defects on the products as image information, for example, texture defect inspection in iron maufacture, paper manufacture and nonwoven fabric manufacture.

What is claimed is:

1. In an image processing apparatus comprising, sensors provided in a camera for sensing state of a test object as image information of lightness of the test object through a lens and outputting image information signals, a first multiplexer receiving simultaneously and in parallel the image information signals outputted from the sensors and outputting the image information signals by means of a first counters, the first counter addressing the first multiplexer so that the first multiplexer outputs the image information signals in a sensed specified range, and processing means for receiving and processing the image information signals outputted from said first multiplexer, said image processing apparatus characterized in that said processing means comprises summing the image information signals by arithmetic units, the image information signals corresponding to the sensed specified range of the test object and outputted from the sensors, subtracting the summed signals by an arithmetic unit, the summed signals corresponding to the sensed specified range of the test object and outputting the subtracted signals to a display section, wherein a second multiplexer having a second counter is connected to said plural sensors, the second counter addressing the second multiplexer so that the second multiplexer outputs the image information signals in the sensed specified range, a shift register is connected to said second multiplexer to receive the image information signals sequentially in time from said second multiplexer and output the image information signals simultaneously and in parallel and, said first multiplexer is connected to said shift register to receive the image information signals outputted from said shift register.

* * * * *